United States Patent
Gu et al.

(10) Patent No.: US 8,287,424 B2
(45) Date of Patent: Oct. 16, 2012

(54) SPEED ADJUSTING MECHANISM FOR ROLLER TRACTION TOROIDAL CONTINUOUSLY VARIABLE TRANSMISSION

(75) Inventors: Huan-Lung Gu, Hualien County (TW); Hui-Chun Ho, Hsinchu County (TW); Min-Chuan Wu, Taipei County (TW); Shih-Che Tzeng, Taipei (TW); Yeu-Jou Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 519 days.

(21) Appl. No.: 12/426,601

(22) Filed: Apr. 20, 2009

(65) Prior Publication Data

US 2010/0120577 A1    May 13, 2010

(30) Foreign Application Priority Data

Nov. 7, 2008    (TW) ............................... 97142983 A

(51) Int. Cl.
    *F16H 15/26*    (2006.01)
(52) U.S. Cl. .......................................... 476/38; 476/36
(58) Field of Classification Search ................. 476/43, 476/44, 38
    See application file for complete search history.

(56) References Cited

U.S. PATENT DOCUMENTS

| | | | |
|---|---|---|---|
| 1,821,833 A * | 9/1931 | Hayes | 475/115 |
| 2,469,653 A | 5/1949 | Kopp | |
| 2,545,152 A * | 3/1951 | Haidegger | 475/215 |
| 3,209,606 A * | 10/1965 | Yamamoto | 476/39 |
| 4,567,783 A * | 2/1986 | Hart | 74/425 |
| 4,735,430 A | 4/1988 | Tomkinson | |
| 4,893,517 A | 1/1990 | Nakano | |
| 4,922,788 A | 5/1990 | Greenwood | |
| 5,236,403 A | 8/1993 | Schievelbusch | |
| 6,241,636 B1 | 6/2001 | Miller | |
| 7,018,320 B2 | 3/2006 | Robinson et al. | |
| 7,074,155 B2 | 7/2006 | Miller | |
| 7,201,701 B2 | 4/2007 | Shibukawa | |
| 7,238,136 B2 | 7/2007 | Miller et al. | |
| 7,322,901 B2 | 1/2008 | Miller et al. | |

* cited by examiner

*Primary Examiner* — William C Joyce
(74) *Attorney, Agent, or Firm* — WPAT, PC; Justin King

(57) ABSTRACT

A speed adjusting mechanism for roller traction toroidal continuously variable transmission is disclosed, which comprises an input disk; an output disk coaxially and symmetrically positioned relative to the input disk; a rotation shaft thought the axis of input disk and output disk; a screw rod coaxially connected to the rotation shaft and being rotated accordingly; and a plurality of friction balls respectively contact with the input disk and output disk and rotate same; each friction ball respectively revolved on its own center axis and each center axis respectively connected to a supporting bracket and each supporting bracket respectively connected to an arc-shaped screw gear; wherein the screw rod is engaged to the screw gears so that they will rotate correspondingly to let each center axis tilt to the same extent so that the input disk and out disk will have different rotation rate.

3 Claims, 22 Drawing Sheets

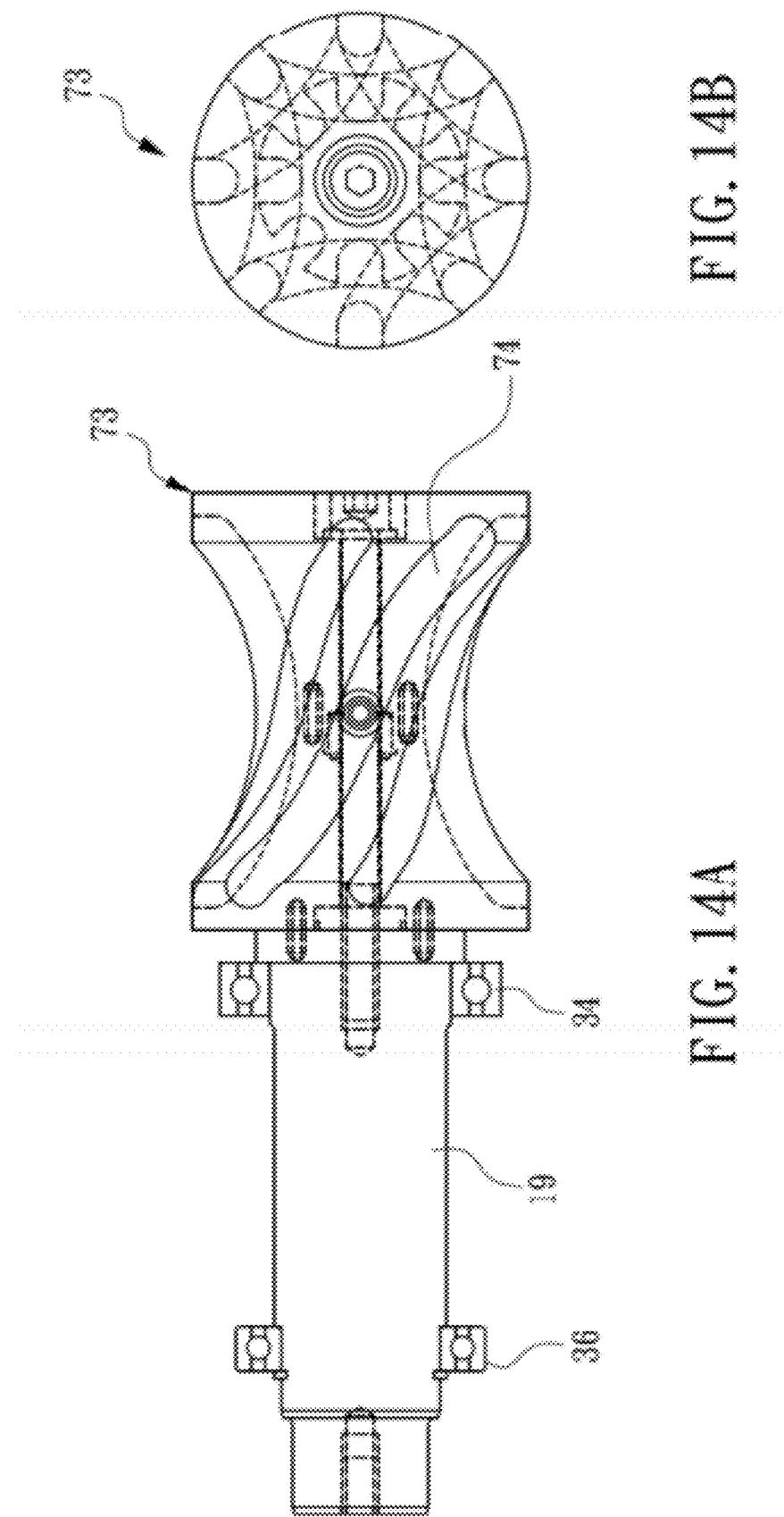

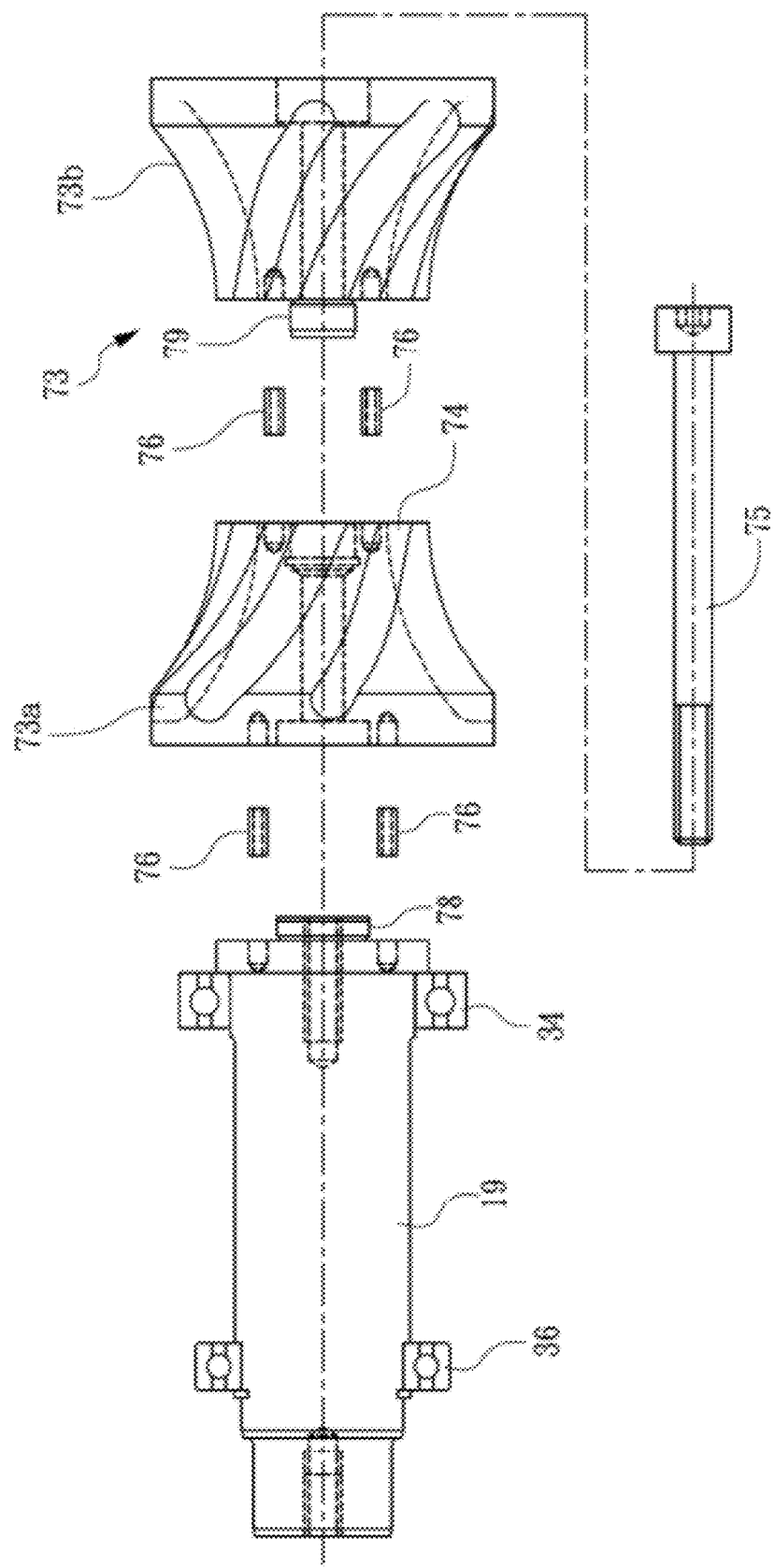

FIG. 19

SPEED ADJUSTING MECHANISM FOR ROLLER TRACTION TOROIDAL CONTINUOUSLY VARIABLE TRANSMISSION

FIELD OF THE INVENTION

The present invention relates to a speed adjusting mechanism for continuously variable transmission, and more particularly, to a speed adjusting mechanism for a roller traction toroidal continuously variable transmission.

BACKGROUND OF THE INVENTION

A continuously variable transmission (CVT), that contrasts with other mechanical transmissions that only allow a few different distinct gear ratios to be selected, is a transmission capable of change steplessly through an infinite number of effective gear ratios between maximum and minimum values. As CVT is capable of allowing the the engine speed to remain at its level of peak efficiency with improved fuel economy and exhaust emissions, it is becoming the transmission of choice for all kinds of modern and future vehicles. There are a variety of CVTs being developed by different manufacturers, among which the metal V-belt CVT and the toroidal CVT are the most common types of CVT. In the metal V-belt stepless CVT, there are two parallel-disposed pulleys that are split perpendicular to their axes of rotation, with a V-belt running between them. As the two pulleys are connected respectively to an input shaft and an output shaft, the input shaft and the output shaft are required to be disposed parallel to each other so that the space needed for accommodating such metal V-belt stepless CVT is comparatively larger, not to mention that the metal V-belt stepless CVT will require a large hydraulic system for power transmission control and speed ratio adjustment. On the other hand, the toroidal CVTs are made up of two traction discs and two rollers, in which the discs, being formed as two almost conical parts disposed coaxially and point to point, are connected respectively to the input and the output shafts, and the rollers are disposed for allowing the same to move along the axis of the near-conical parts, changing angle as needed to maintain contact so as to transfer power from the input disc to the output disc by the friction of the contact. As the input shaft and the outshaft in the toroidal CVTs are coaxially disposed, it requires less space for accommodating the same. In addition, comparing with the metal V-belt CVTs, speed ratio adjustment in the toroidal CVTs can be performed with less power. Nevertheless, both the metal V-belt CVT and the toroidal CVT have their pros and cons, considering different applications.

According to the shape of the rollers housed between the two toroidal-shaped discs, the toroidal CVTs can be divided into three types, which are ball toroidal CVTs, half-ball toroidal CVTs and wheel toroidal CVTs. Among which, since the ball toroidal CVT is able to provide a comparatively more stable power transmission and it can change the rotation speed ratio of the input and the output shafts simply by tilting the rotation spindles of the its two friction balls for allowing the two to contact the discs at different areas, the ball toroidal CVT is regarded as the most promising CVT for future applications. There are already many studies relating the improvement of the ball toroidal CVT, such as those developed by Fallbrook Technologies Inc. U.S.A and disclosed in U.S. Pat. No. 2,469,653 and U.S. Pat. No. 5,236,403. The ball toroidal CVTs disclosed in the patents of the Fallbrook Technologies Inc. are characterized in that: the speed adjusting can be achieved by enabling a friction ball carrier on which the friction balls with their ball spindles are mounted to move parallel along the hub axis of the CVT as the tilting angles of the friction balls are changed thereby.

Although the aforesaid ball toroidal CVTs have the following advantages: it requires less parts for configuring the same and the there is less resistance being caused during speed adjusting, it is still not feasible for any practical usage since there are difficulties for applying the ball toroidal CVT in automatic electric speed control. Therefore, the ball toroidal CVTs are currently being used as the transmissions for bicycles. Moreover, with the advance of artificial intelligence (AI), it is in need of an improved CVT capable of using an evaluation of an embedded AI algorithm to control an electric motor for driving its speed adjusting mechanism to act accordingly and thus achieving an optimal output.

SUMMARY OF THE INVENTION

The present invention provides a speed adjusting mechanism for roller traction toroidal continuously variable transmission, which comprises an input disk; an output disk, coaxially and symmetrically positioned relative to the input disk; a rotation shaft, arranged passing thought the axes of input disk and output disk; a screw rod, coaxially connected to the rotation shaft so as to be brought to rotate therewith; and a plurality of friction balls, each respectively being enabled to contact with the input disk and output disk for bringing the input disk and output disk to rotate with the rotation of the same, and each friction ball being enabled to revolve on its respective spindle and each spindle is respectively connected to a supporting bracket while each supporting bracket is further connected to an arc-shaped screw gear; wherein the screw rod is engaged to screw gears for enabling the rotation of the screw rod to bring the screw gears to rotate correspondingly and thus causing the spindles of the plural friction balls to tilt by the same extent and consequently enabling the input disk and the out disk to rotate at different rotation speeds.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 14A is a fragmentary side view showing a potion of the assembly of a rotation shaft and friction balls in the second embodiment of the invention.

FIG. 14B is a fragmentary side view showing a potion of the assembly of a rotation shaft and a barrel cam in the second embodiment of the invention.

FIG. 16 is an exploded view of a rotation shaft and a barrel cam used in the second embodiment of the invention.

FIG. 19 is a side view depicting the friction balls in the third embodiment of the invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
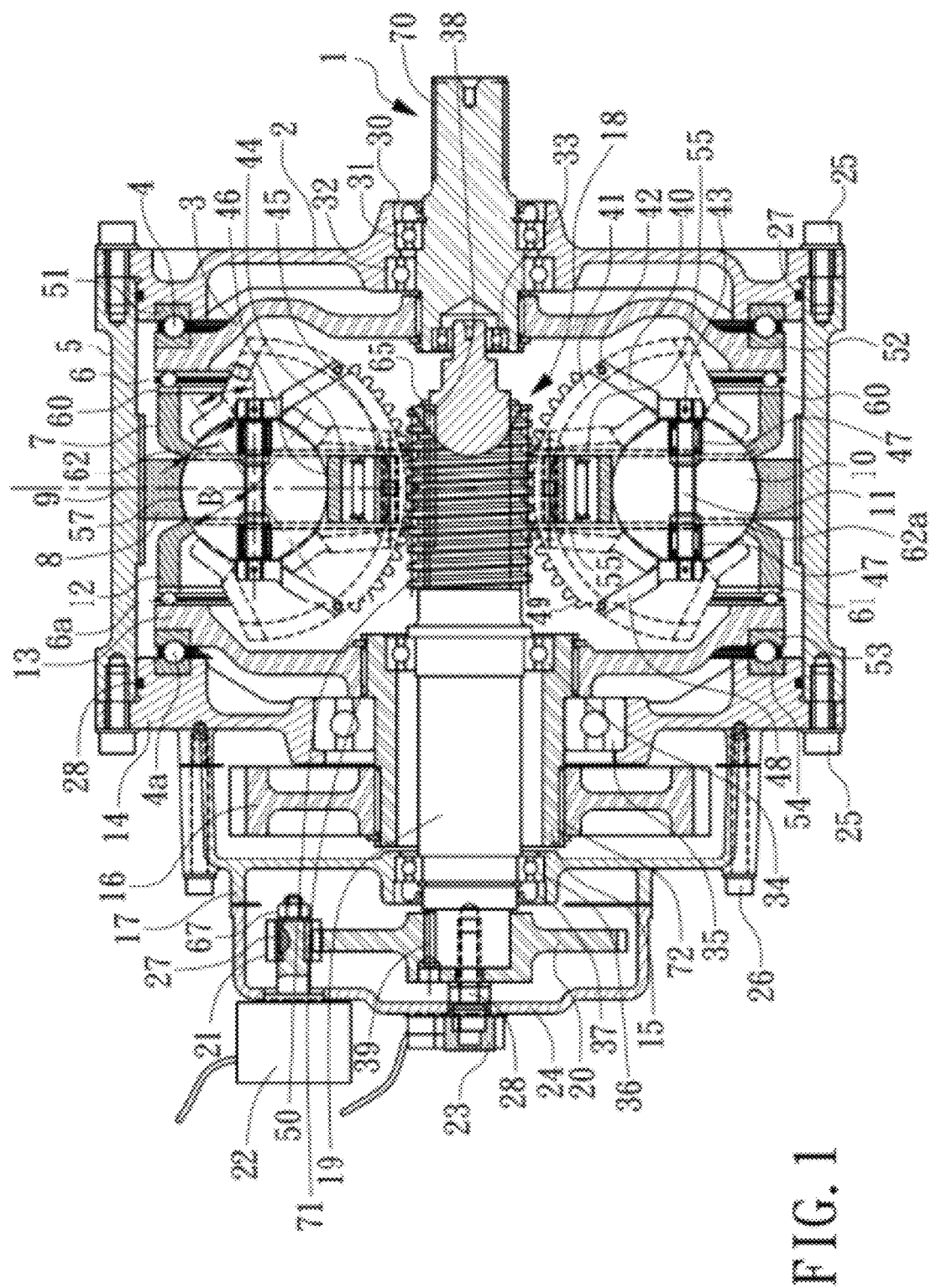
FIG. 1 is a sectional view of a speed adjusting mechanism for roller traction toroidal CVT with screw gear set according to a first embodiment of the invention.
Figure 2:
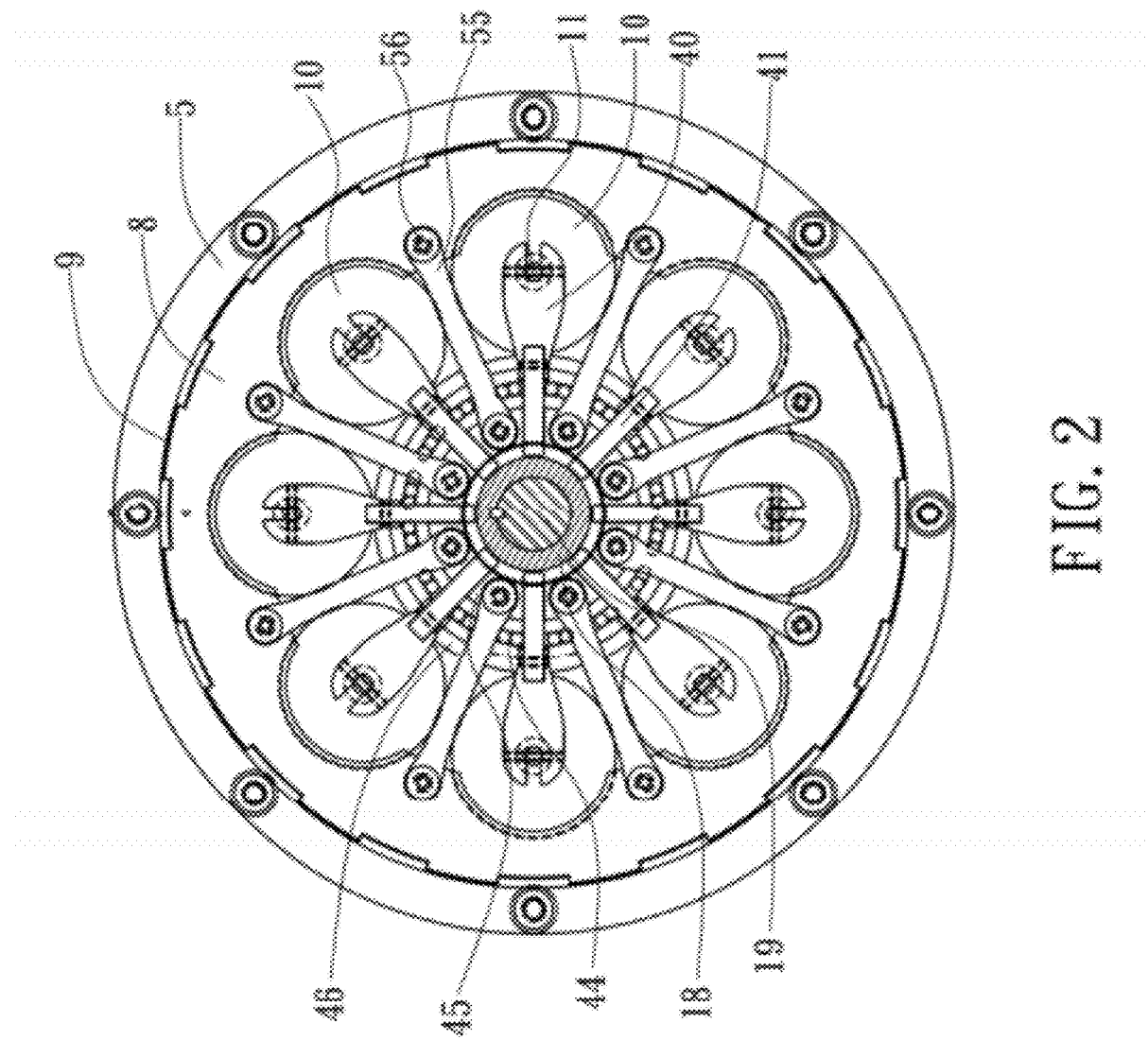
FIG. 2 is an end view of FIG. 1.

Please refer to FIG. 1 and FIG. 2, which are a sectional view of a speed adjusting mechanism for roller traction toroidal CVT with screw gear set according to a first embodiment of the invention, and a side view thereof. As shown in FIG. 1, the input shaft 1 of the speed adjusting mechanism a is mounted on a bearing seat 2 by the oil seal 30 and the bearings 31, 32, by that the input shaft 1 is provided for an input disc 3 to mounted thereon so as to transfer the power input to the speed adjusting mechanism a from the input shaft 1 to the input disc 3. When the input disc 3 is being driven to rotate, a roller disc 6 will be brought along to rotate therewith, and thus, eventually cause the rotating of the roller disc 6 to be wedged by a cam lobe 60 disposed between an input friction disc 7 and the roller disc 6, by that there will be a huge axial trust being generated between the roller disc 6 and the input friction disc 7. The axial trust will push the input friction disc 7 to move toward the friction balls 10 while the same time pushing the input disc 3 toward the bearing seat 2, by that the input disc 3, the roller disc 6 and the input friction disc 7 are tightly engaged with each other as a unity and thus rotate in synchronization. It is noted that there are lubricants filled in the gaps between the aforesaid components that are used for preventing those metallic components from contacting directly with each other. As the roller engaging surface 52 of the input disc 3 is being lubricated for preparing the same to be abutted by the hard rollers of the roller bearing disc 4, the input disc 3 is protected from the wear and tear caused by friction when it is being driven to rotate. Moreover, since the axial trust will be passed to the bearing seat 2 through the roller bearing disc 4, the bearing seat 2 is designed to support the pressure from the rollers of the roller bearing disc 4 by its hard-treatment roller engaging surface 51 and further it is fixedly secured to a case 5 by bolts 25. As the input friction disc 7 is tightly engaged with a plurality of friction balls 10 by the friction zones 62 corresponding thereto, any power received by the input friction disc 7 will be transferred to the friction ball 10 in synchronization and in real time.

The plural friction balls 10, being equiangularly disposed around the input shaft 1, are restricted by the ball receiving parts 57 formed on the interior of an outer ring seats 8 at their designated locations whereas the outer ring seat 8 is located radially outside and surrounding the friction balls 10. It is noted that each ball receiving part 57 is positioned centering on the center of its corresponding friction ball 10 while allowing the friction ball to revolve as there is a gap to be formed in between, by that each friction ball 10 is positioned relative to its center. Moreover, as the exterior of the outer ring seat 8 is formed with protrusions to be fitted inside the grooves on the case 5, the friction balls 10 are restricted from revolving about the axis of the input shaft 1, but are only allow to revolve on its own spindle 11 as there are bearings 47 being arranged at the two ends of each spindle 11 for supporting its corresponding friction ball 10 to revolve freely on the axis thereof. In addition, there is an inner ring seat 46 located radially inside the enclosure of the plural friction balls 10 while being mounted on a bearing 44 for allowing the same to revolve freely, by that the plural friction balls 10 are defined in spaces sandwiched between the inner ring seat 46 and the outer ring seat 8. It is noted that the bearing 44 shares the same axis with the input shaft 1. Thereby, although the pressure exerting on the plural friction balls 10 from the input friction disc 7 will be passed to force on the inner ring seat 46 as the inner ring seat 46 is being driven to revolve on the axis of the bearing 44 by the revolving of the friction balls 10, there will be no significant power loss resulting from the friction caused by the aforesaid motions. Moreover, since the plural friction balls 10 will come into contact with the inner side of the same input friction disc 7 at positions thereof on a circle path of he input friction disc 7 defined by a radius, that is, they will come into contact with the input friction disc 7 at their respective friction zones 62a, the plural friction balls 10 will revolve at the same revolving speed.

By the viscosity of the lubricant, each revolving friction ball 10 will drag an output friction disc 12 to rotate which will cause a cam lobe 60 to engage with the output friction disc 12 by one end thereof and thus generate an axial trust to press a roller disc 6a for forcing the same to engage tightly on the roller engaging surface 53 of an output disc 13. Moreover, the axial trust will be passed from the output disc 13 to the bearing seat 14 through a roller bearing disc 4a, whereas the bearing seat 14 is designed to support the pressure from the rollers of the roller bearing disc 4a by its hard-treatment roller engaging surface 54 and further it is fixedly secured to the case 5 by bolts 25. As the result, the output friction disc 12, the roller disc 6a and the output disc 13 are tightly engaged with each other as a unity by the axial trust of the cam lobe 61 and thus rotate in synchronization. Similarly, the axial trust will force the output friction disc 12 to tightly engage with the plural friction balls 10 by the friction zones 62a corresponding thereto while filling lubricants in the gaps between the aforesaid components for preventing those metallic components from contacting directly with each other, by that any power received by the output friction disc 12 form the plural friction ball 10 will be transferred to an output shaft 15 through the output disc 13 where the power is further being transferred to a power-output gear 16. The output shaft 15 is mounted on the bearing seat 14 by the two bearings 34, 35 in a manner that it is disposed coaxial with the input shaft 1. When the roller disc 6, the roller disc 6a, are engaged tightly with the cam lobes 60, 61 in respective, the power received by the input friction disc 7 will be transferred to the output friction disc 12 through the friction balls 10 in synchronization and in real time. Moreover, since the high pressure resulting from the axial trust will force the aforesaid parts to tightly engaged with one another while only allowing minute gaps as thin as a layer of oil film, there will be little or even no slippery happening between those tightly engaged parts so that the power transferring efficiency can be very satisfactory. As the friction balls 10 are designed to revolve respectively on their spindles 11, the linear velocity relating to each input side friction zone 62 is obtained by multiple the friction ball's input radius A with revolving speed of each friction ball 10, and similarly the linear velocity relating to each output side friction zone 62a is obtained by multiple the friction ball's output radius B with revolving speed of each friction ball 10. Consequently, the rotation speed of the input friction disc 7 is dependent upon the linear velocities relating to the input side friction zone 62 while the rotation speed of the output friction disc 12 is dependent upon the linear velocities relating to the output side friction zone 62a. By that, the speed ratio between the input friction disc 7 and the output friction disc 12 is equal to the ratio between the input radius A and the output radius B, i.e. the rotation speed ratio between the input shaft 1 and the output shaft 15 is equal to the ratio between the input radius A and the output radius B. However, both the input radius A and the output radius B are determined by the tilting angle θ of the friction ball's spindle, i.e. by changing the tilting angle θ, the values of the input radius A and the output radius B will be changed accordingly, and thus, the rotation speed ratio between the input shaft 1 and the output shaft 15 is changed. It is noted that the tilting angles of all the friction balls 10 in this mechanism should be the same and changing in synchronization for enabling the mechanism to change the rotation speed ratio accurately.

Figure 3:
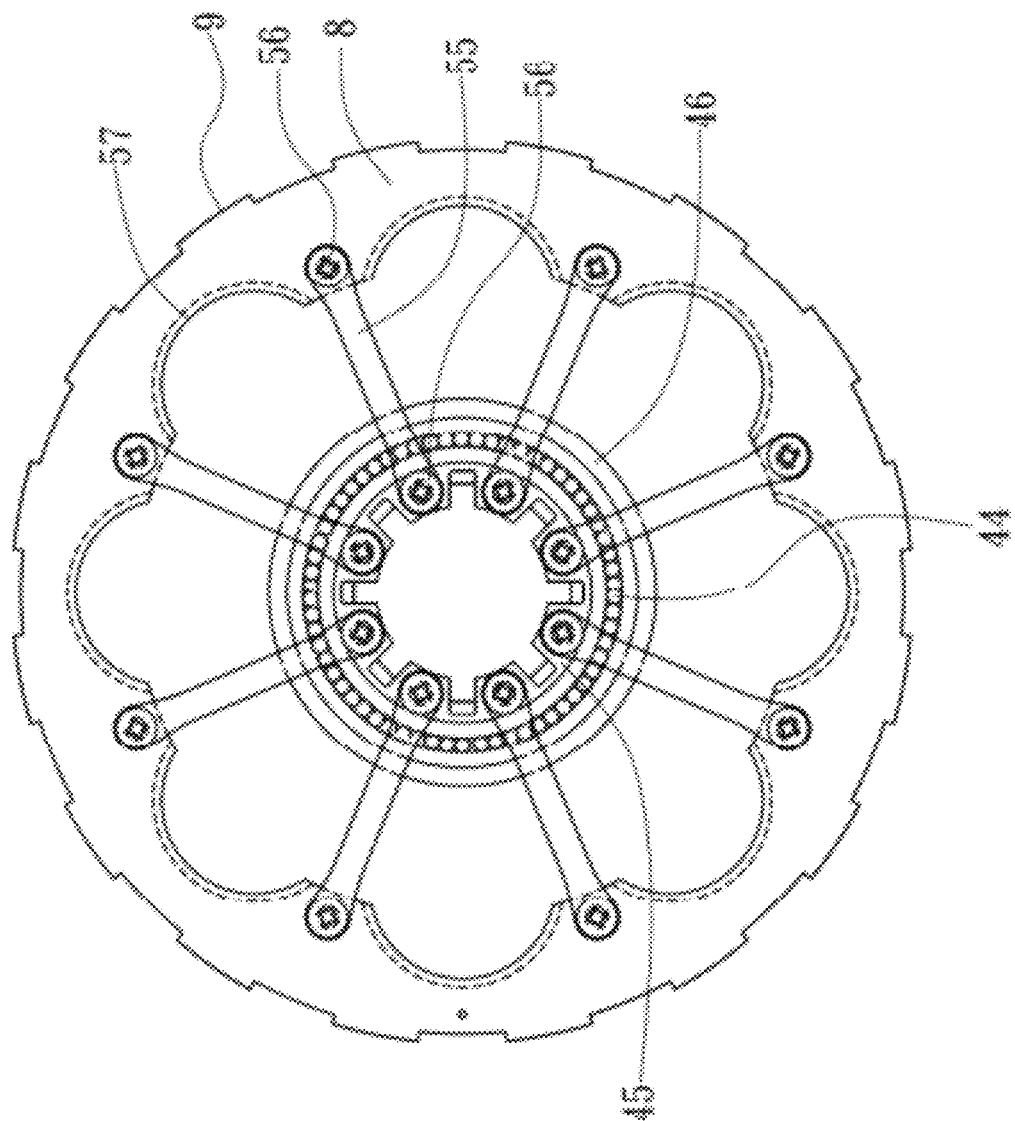
FIG. 3 is a side view of an outer ring seat for fiction balls used in the first embodiment of the invention.
Figure 4:
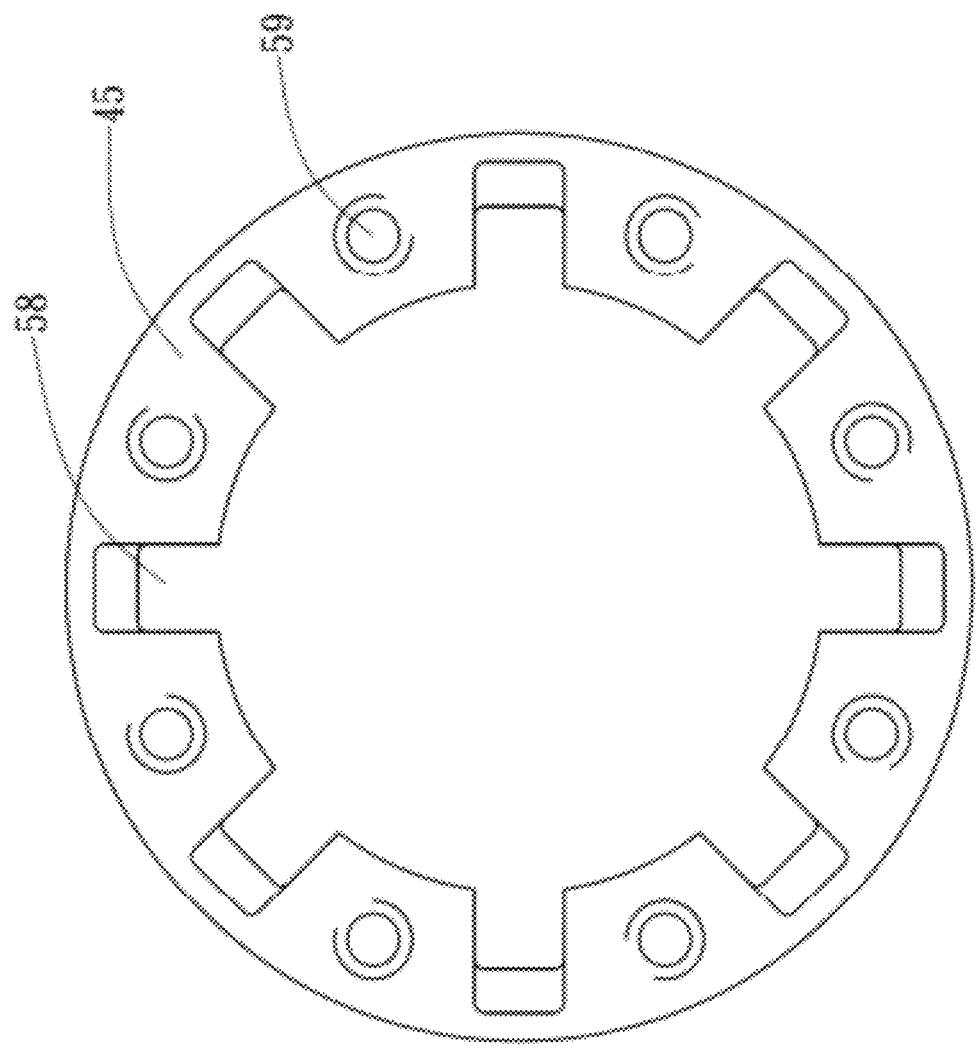
FIG. 4 is a side view of a support bracket base for fiction balls used in the first embodiment of the invention.
Figure 6:
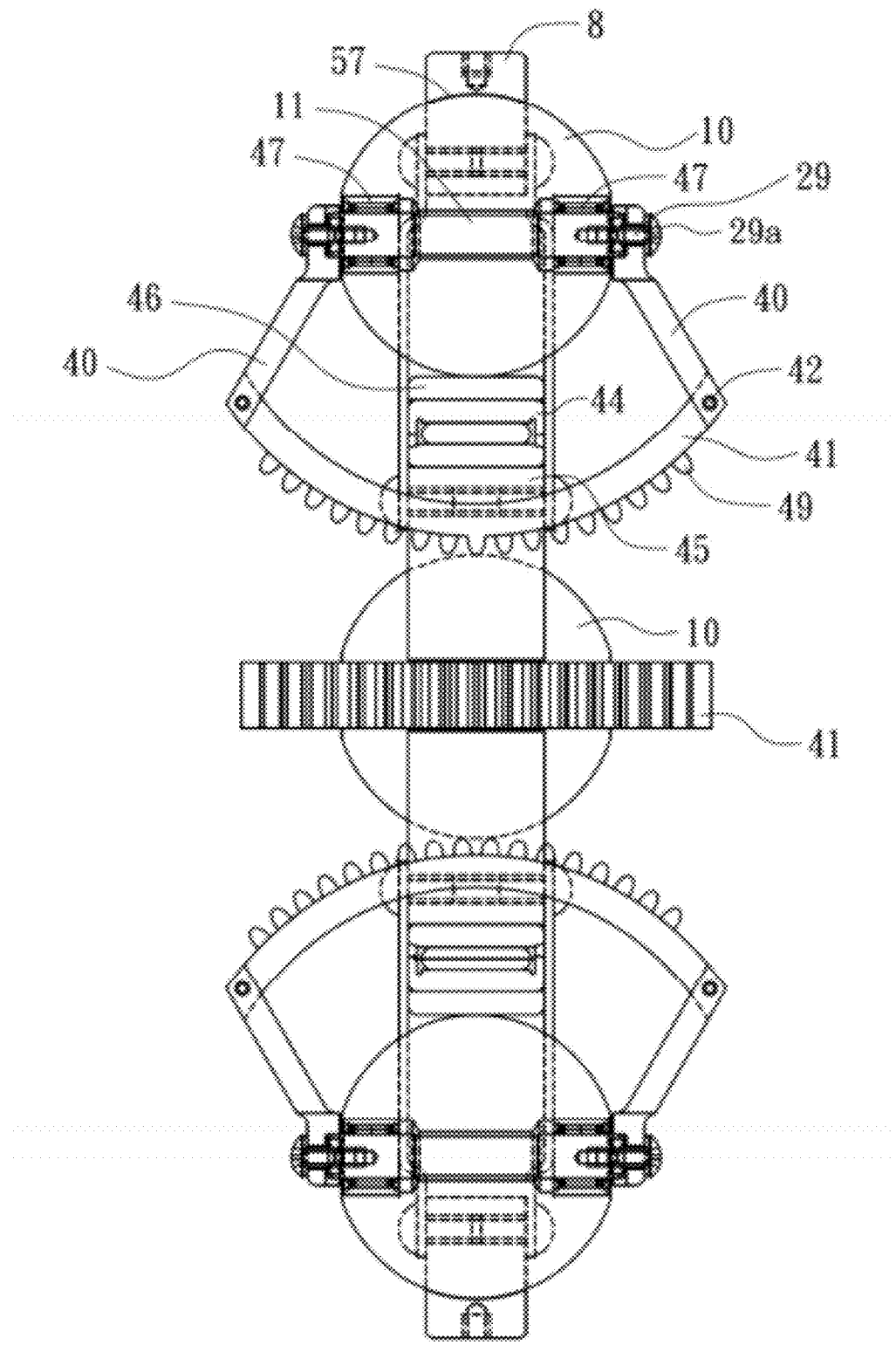
FIG. 6 is a fragmentary side view showing a potion of the assembly of a screw gear set and friction balls in the first embodiment of the invention.
Figure 7:
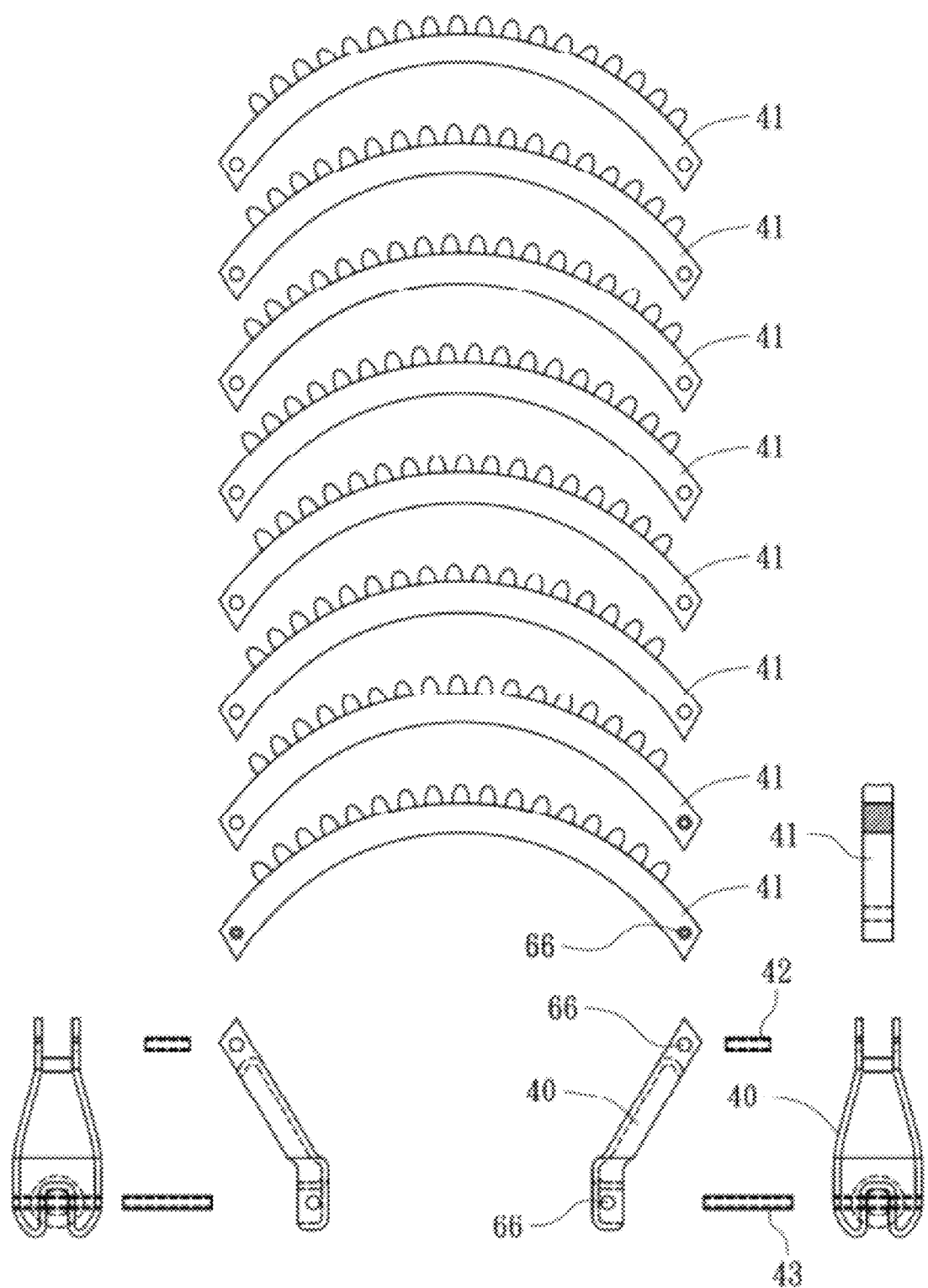
FIG. 7 is an exploded view of a screw gear and a supporting bracket used in the first embodiment of the invention.

For changing the tilting angles of all the friction balls 10 in synchronization so as to enable the mechanism of the invention to change and adjust the rotation speed ratio accurately, the key speed adjusting component in the first embodiment of FIG. 1 is the assembly of screw rod and screw gears. As shown in FIG. 1, there are two supporting brackets 40, 48 fixedly attached to the spindle 11 of each friction ball 10 by the two ends thereof. In this embodiment, the two supporting brackets 40, 48 are fixed to the corresponding spindle 11 by the use of pins 43. However, the fixing of the supporting brackets 40, 48 is not limited thereby, they can be fixed by the use of screws 29 and washers 29a as shown in FIG. 6. Moreover, the two supporting brackets 40, 48 are also connected to a screw gear 41 while being fixed thereon by the use of another pins 42. The screw gear 41 is shaped like an arc whose teeth are formed on the convex thereof facing toward the axis of the input shaft 1, and the arc-shaped screw gear 41 is disposed centering on the center of its corresponding friction ball 10 while allowing an limiter to pass through the center portion of each screw gear 41. The limiter 45 being shaped like a cylinder is disposed coaxial with the input shaft 1 while allowing the exterior of the limiter 45 to engaged tightly to the inside of a bearing 44. In addition, the limiter 45 is formed with a plurality of grooves 58 at positions thereon corresponding to the screw gears 41 in respective that are used for receiving the screw gears 41 therein and thus restricting screw gears 41 to move in arc-like paths surrounding their centers on a surface coplanar with the axis of the rotation shaft 1, as shown in FIG. 4. There are a plurality of screw holes 59 formed on the two sides of the limiter 45, which are provided for fixedly connecting the limiter 45 to the outer ring seat 8 by the use of connecting plates 55 and screws 5 for preventing the limiter 45 to rotate along with the inner ring seat 46, as shown in FIG. 3. Since all the screw gears 41 are meshed with the same screw rod 18 while being equiangularly disposed around the input shaft 1 at positions corresponding to the plural friction balls 10, the teeth 49 of different screw gears 41 will engage with the thread teeth 50 of the screw rod 18 by different phase angles and the phase angle difference between any two adjacent screw gears 41 can be obtained by dividing the teeth pitch of the screw rod 18 with the number of the friction balls 10. Therefore, by sequentially changing the angle of the teeth 49 of each screw gear 41 according to the ordering of the screw gears 41, all the screw gears 41 can be properly mounted on the screw rod 18 while enabling the spindles of the corresponding friction balls 10 to be tile by the same tilting angle θ.

Figure 5:
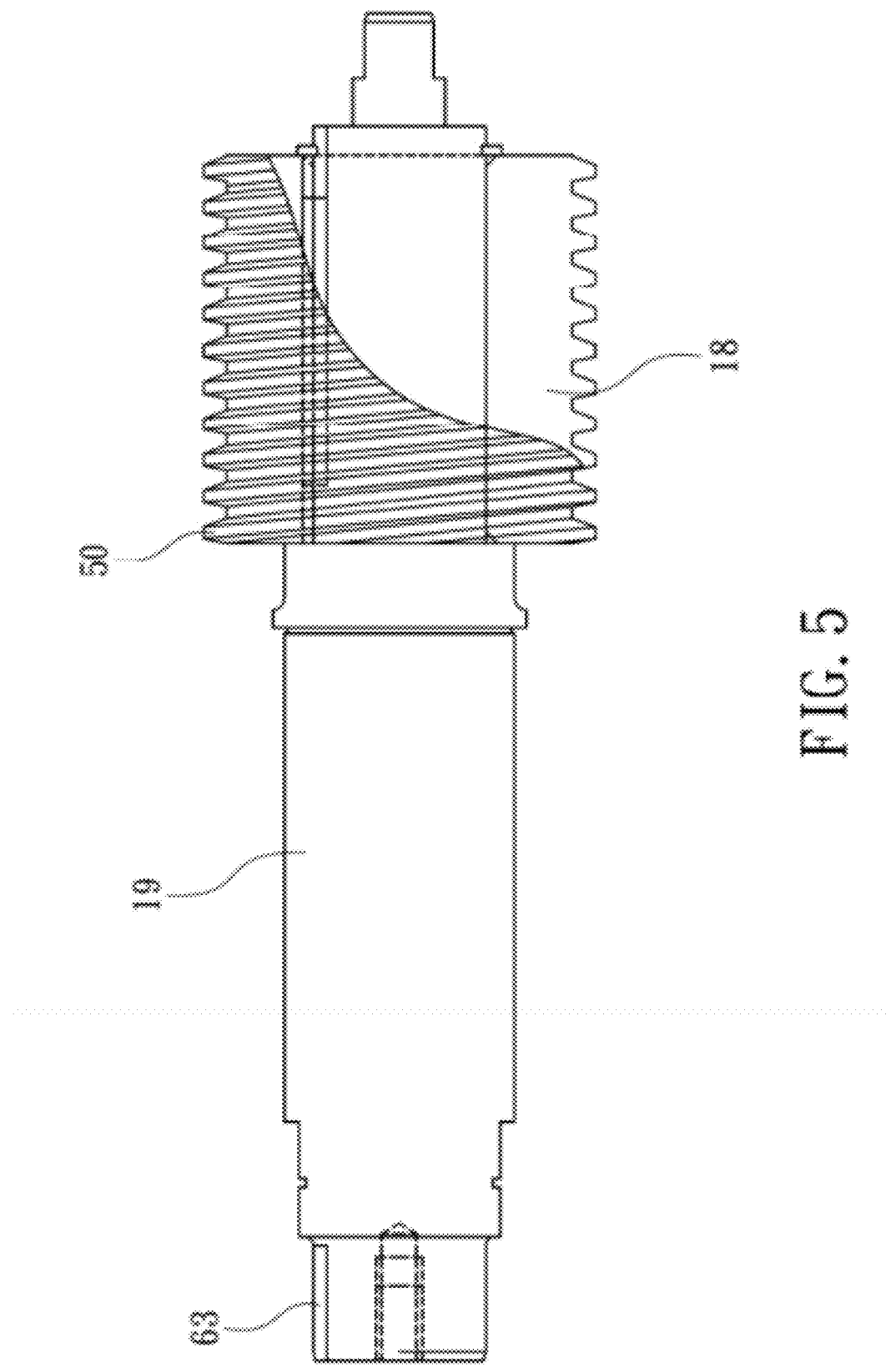
FIG. 5 is a side view showing the assembly of a screw rod and a rotation shaft in the first embodiment of the invention.

The reason why the supporting brackets 40, 48 are fixed to the screw gears 41 by pins is that the ordering of the screw gears 41 can be achieved by drilling pin holes at different positions on the same type of screw gears 41 and the same type of supporting brackets 40, 48 for fitting in the same type of pins 42, and further the friction balls 10 can be the same as well. Moreover, the aforesaid embodiment is suitable for mass production since all the friction balls 10, spindles 11, supporting brackets 40, 48, screw gears 41, outer ring seat 8, inner ring seat 46, bearing 44 and limiter 45 can be pre-assembled first as one assembling part which is then assembled with the rotation shaft 19 and the screw rod 18 to formed another assembling part, as shown in FIG. 5 and FIG. 6.

Generally, if there are only a few friction balls 10 being configured in the aforesaid speed adjusting mechanism, i.e. if there are less than four friction balls, instead of the thread, the screw rod 18 can be configured with a plural rows of thread teeth 50 formed thereon for enabling each row of thread teeth to engage with its corresponding screw gear 41 and friction balls 10, and the pitch between neighboring rows is defined by a specific phase difference that can be obtained by dividing 360 degrees with the number of the friction balls. By forming rows of thread teeth 50 on the screw rod 18 according to the so-obtained phase difference, the pitches between their corresponding screw gears 41 will be the same so that the screw gears 41 can be shaped exactly the same without the requirement of numbering those screw gears 41 to be used for distinguishing. In addition, each screw gear 41 can be integrally formed with its corresponding supporting brackets 40, 48 that they are no longer required to be connected to each other by pins 42. However, it is difficult to manufacture a screw rod 18 with more than four rows of thread teeth 50. Nevertheless, if there are more than 10 friction balls, it is still preferred to arrange the screw gears according to an evenly divided phase difference for enabling the pitches between their corresponding screw gears 41 to be the same.

Figure 8:
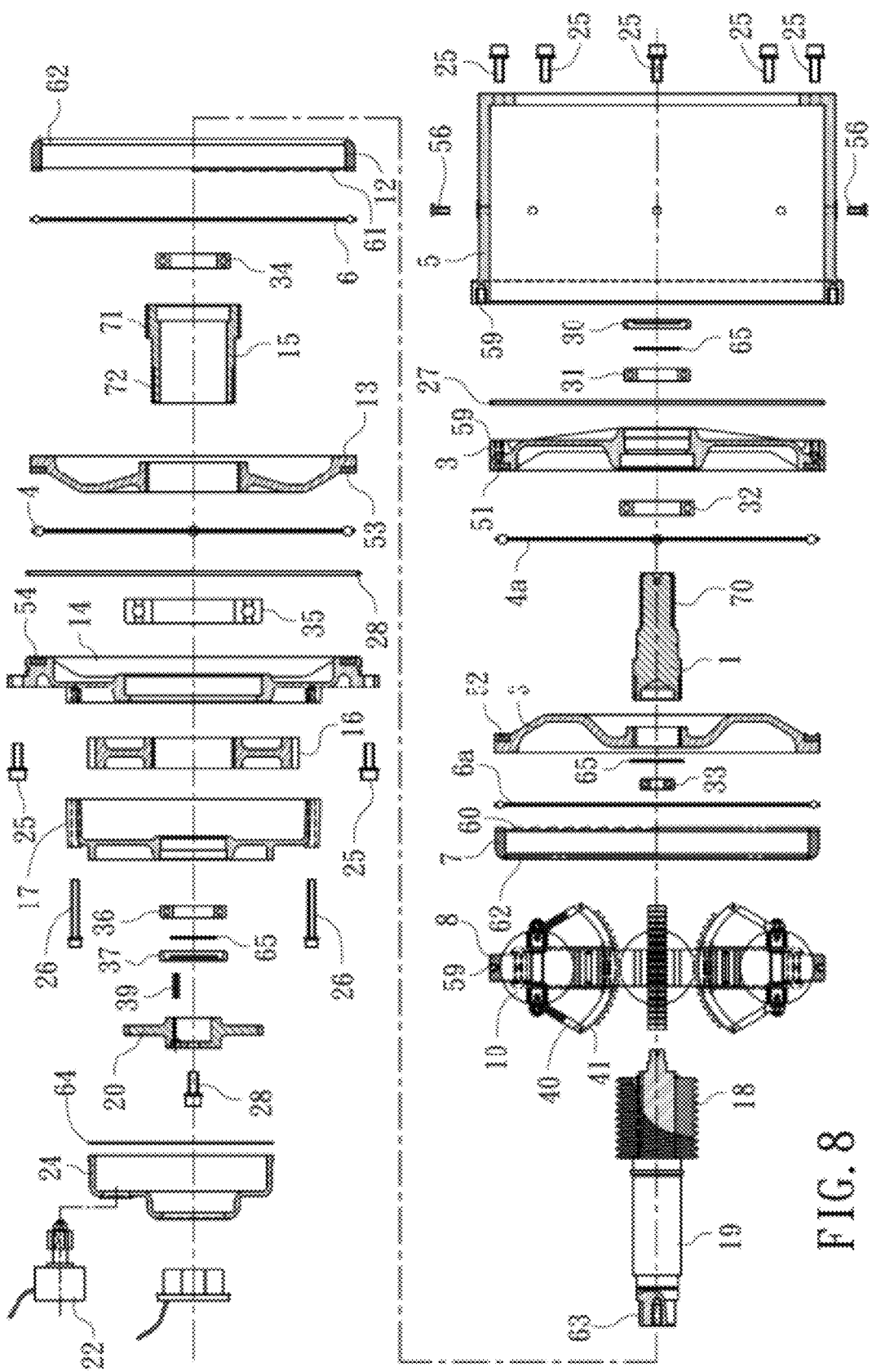
FIG. 8 is an exploded view of the speed adjusting mechanism for roller traction toroidal CVT with screw gear set shown in the first embodiment of the invention.
Figure 9:
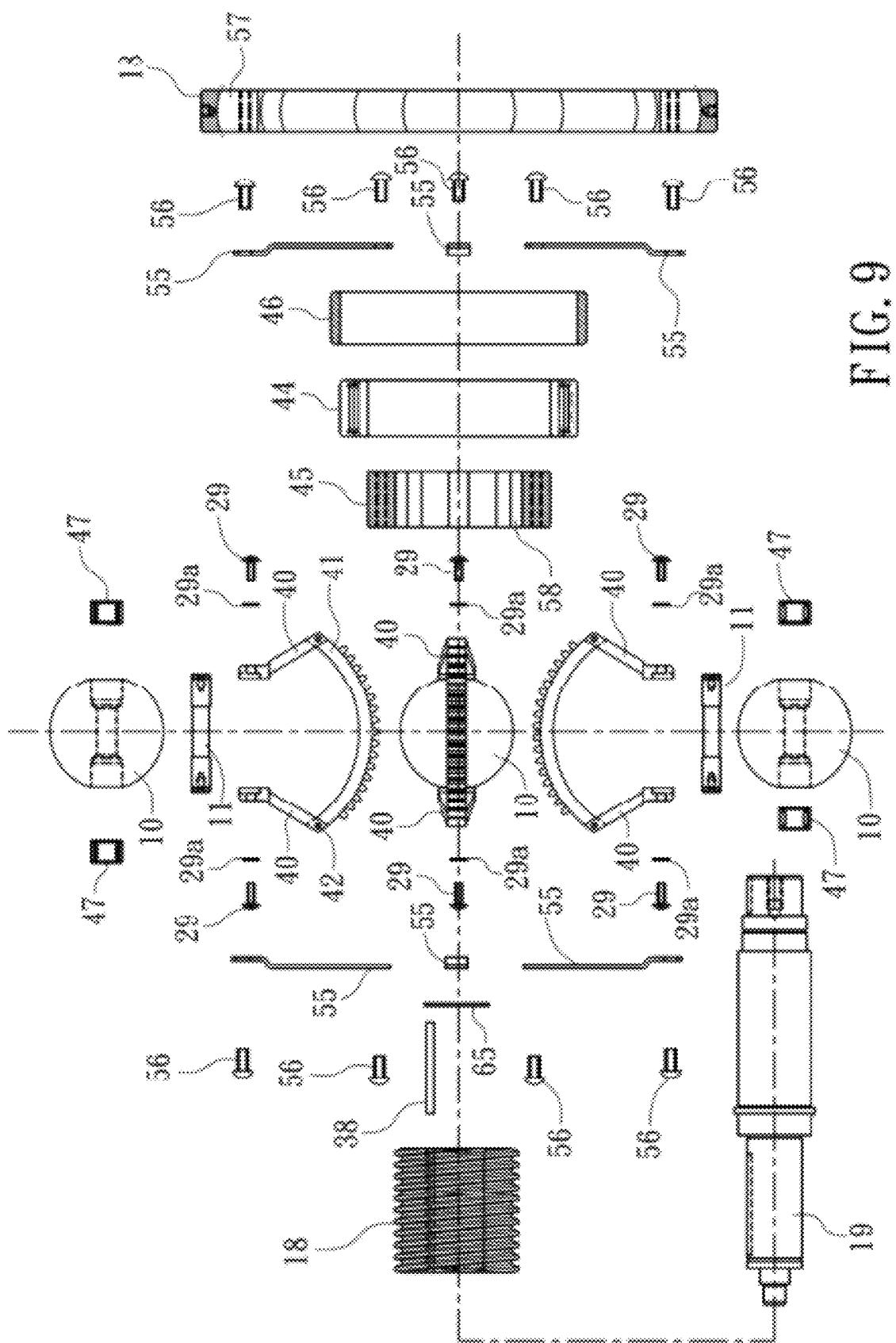
FIG. 9 is an exploded view of a rotation shaft, a screw gear set and friction balls used in the first embodiment of the invention.

Please refer to FIG. 8 and FIG. 9 are exploded views respectively showing the speed adjusting mechanism for roller traction toroidal CVT with screw gear set and the rotation shaft, the screw gear set and friction balls configured therein according to the first embodiment of the invention. As shown in FIG. 1, the screw rod is fixedly mounted on the rotation shaft 19 by the pin 38 and the snap ring 65; and the rotation shaft 19, being arranged ensheathed by the output shaft 15, is fixedly secured at the axis of the output shaft 15 by the use of the bearing 36 and the oil seal 37 while having its front end being supported by another bearing 33. The rear end of the rotation shaft 19, that is designed to protrude out of the gear box 17 containing the output shaft 15, is formed with a key groove 63, that can work cooperatively with a connecting bolt 28 for fixing and coupling the rear end of the rotation shaft 19 to a gear 20. As the gear 20 is further connected to a motor 22 through the coupling of another gear 21 while the gear 21 is coupled to the output shaft of the motor 22 by the use of a key 27 and a nut 67, the rotation shaft 19 can be driven to rotate directly by the motor 22. Moreover, the rear end of the rotation shaft 19 is further connected to an angular position sensor 23 by the connecting bolt 28 for detecting the rotation angle of the rotation shaft 19. It is noted that he angular position sensor 23 and the motor 22 are both mounted on the case cover 24, and the parts relating to the outer shell of the speed adjusting mechanism including case cover 24, and bearing seat 17 are assembled as an unity by the bolts 26 and pads 64. In this embodiment, the parts relating to power transferring including the gear 16, output disc 13, input disc 16, output shaft 15 and input shaft 1 are connected by the use of spline teeth 70, 71, 72, but the aforesaid connecting is not limited thereby.

When there is a need for changing the rotation speed ratio of the input and the output shafts for achieving a specific power output, an optimal tilting angle θ relating to the inclination of the spindles of friction balls can be obtained by the calculation of a micro computer which is then being converted into an rotation angle of the rotation shaft 19. Then, a control signal basing upon the rotation angle can be issued for directing the motor to operate accordingly and thus driving the gears 20, 21 to bring along the rotation shaft 19 to rotate. It is noted that the screw rod 18 will be brought to rotate with the rotation of the rotation shaft 19 and further the rotation of the screw rod will cause the screw gears 41 to move accordingly which will eventually cause their corresponding supporting brackets 40, 48 and spindles 11 to move as well. Moreover, as all the friction balls 10 are restricted from revolving about the axis of the input shaft 1, but are only allow to revolve on its own spindle 11, all the corresponding screw gears 41 are restricted to move in arc-like paths revolving on the centers of the friction balls 10. Therefore, when all the screw gears 41 are driven by the screw rod 18 to move by a same displacement, the tilting angles of their spindles 11, i.e. tilting angle θ relating to the inclination of the spindles 11 of friction balls 10, will be varied by the same extent and thereby the required changing of the rotation speed ratio is achieved. It is noted that the micro computer is able to confirm whether the required changing of the rotation speed ratio is achieved by measuring the rotation speeds of the input shaft 1 and the out shaft 15, or by measuring the actual rotation angle of the rotation shaft 19 using the angular position sensor 23. In this embodiment, the torque of the motor 22 used for speed ratio adjustment, being enlarged by the reduction gear sets 20, 21, is transmitted by the rotation shaft 19 and the screw rod 18 to be used for driving the crew gears 41 as well as their corresponding supporting brackets 40, 48 to move accordingly, so that the relating speed adjusting operation not only can be accurately performed, but also can be performed in quick response. In addition, as each screw gears 41 is arranged to engage with the thread of the screw rod 18 by more than one gear tooth at the same time so that the uncertainty relating to the tilting angles of the friction balls caused by the undesired gaps between the meshed teeth and thread can be prevented. Thereby, in this embodiment, the process of speed ratio change can be performed rather smoothly and continuously without abrupt vibration.

Figure 10:
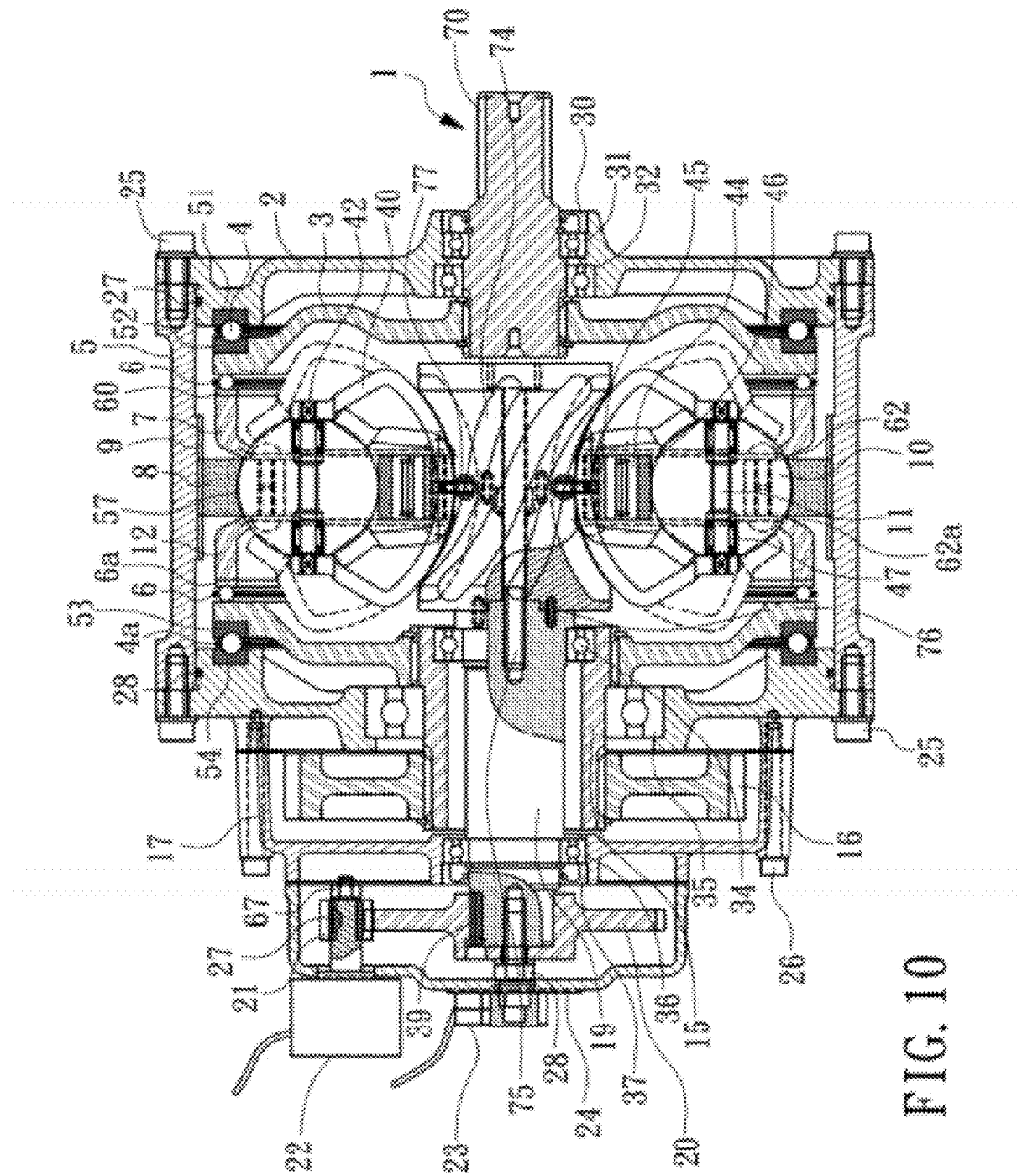
FIG. 10 is a sectional view of a speed adjusting mechanism for roller traction toroidal CVT with barrel cam according to a second embodiment of the invention.
Figure 11:
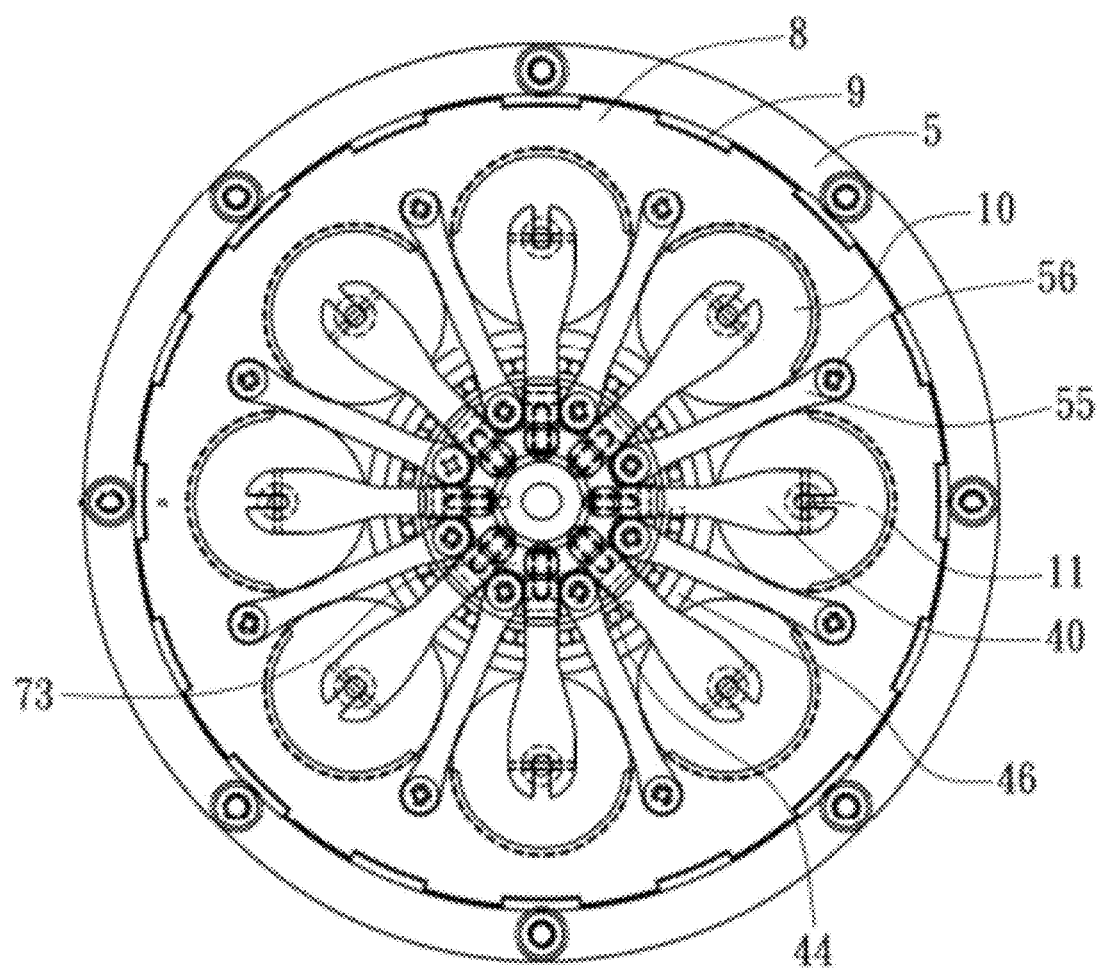
FIG. 11 is a side view of FIG. 10.
Figure 12:
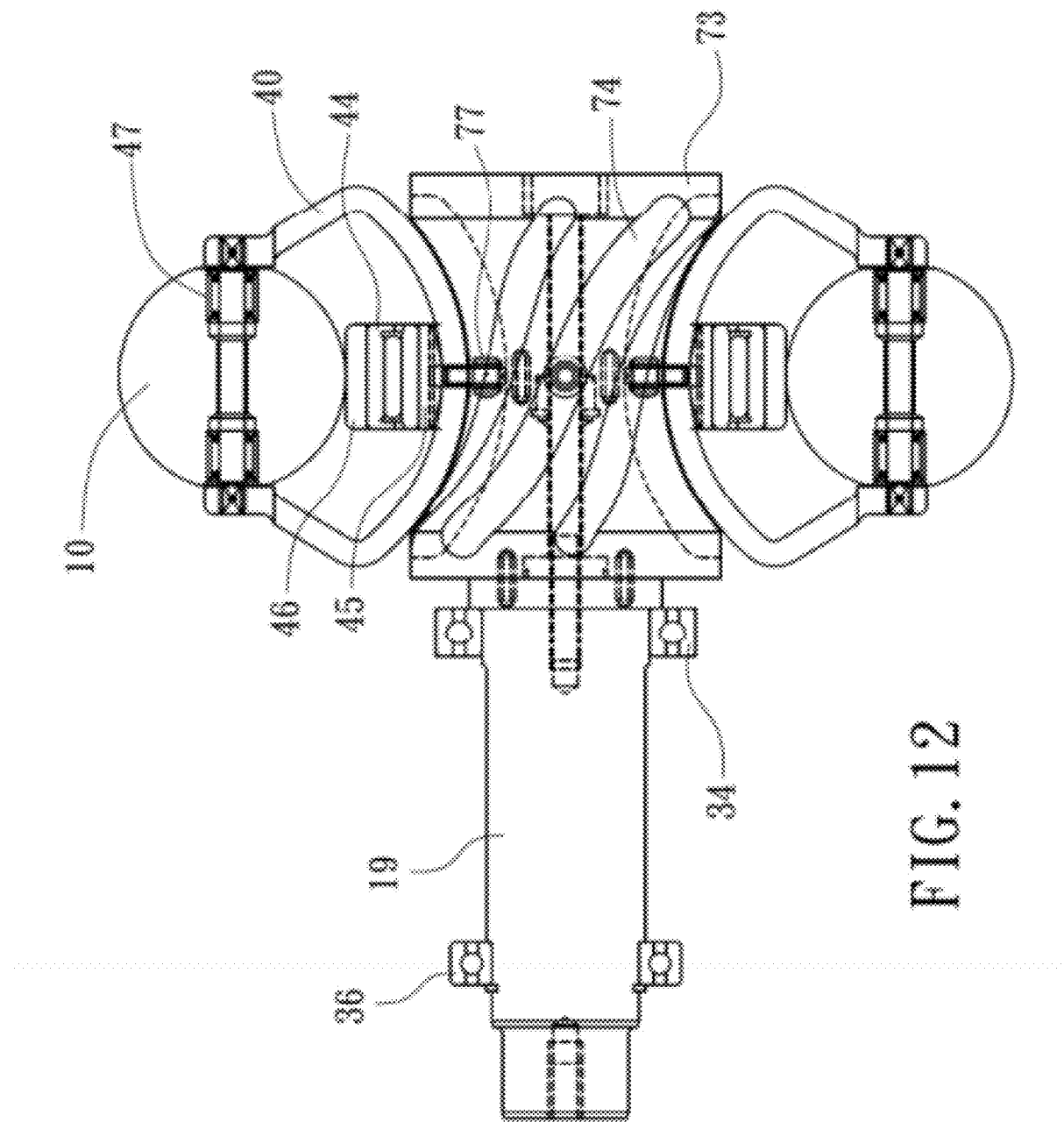
FIG. 12 is a fragmentary side view showing a potion of the assembly of a rotation shaft, a barrel cam and friction balls in the second embodiment of the invention.
Figure 13:
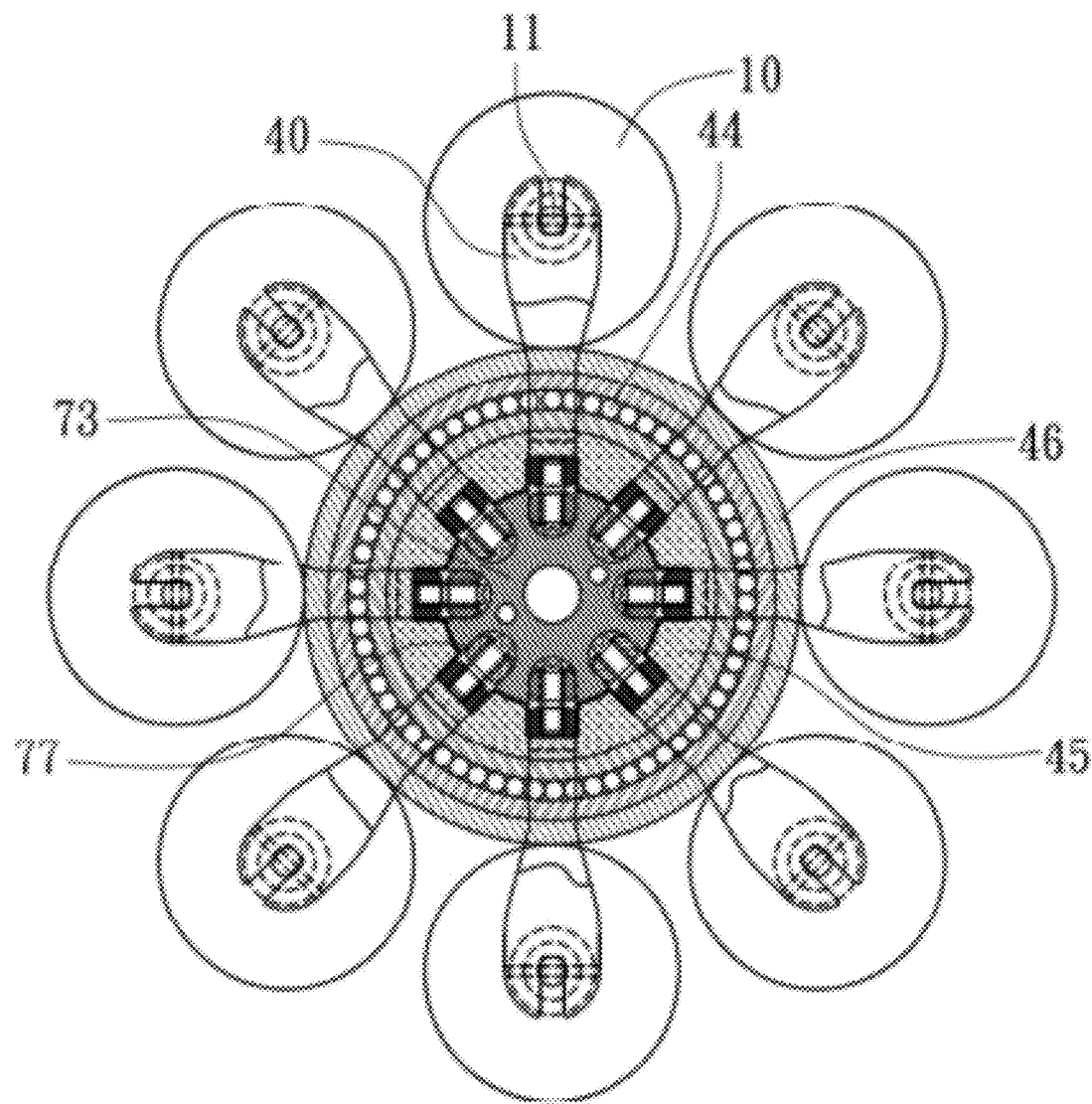
FIG. 13 is a fragmentary side view showing a potion of the assembly of a barrel cam and friction balls in the second embodiment of the invention.
Figure 15A:
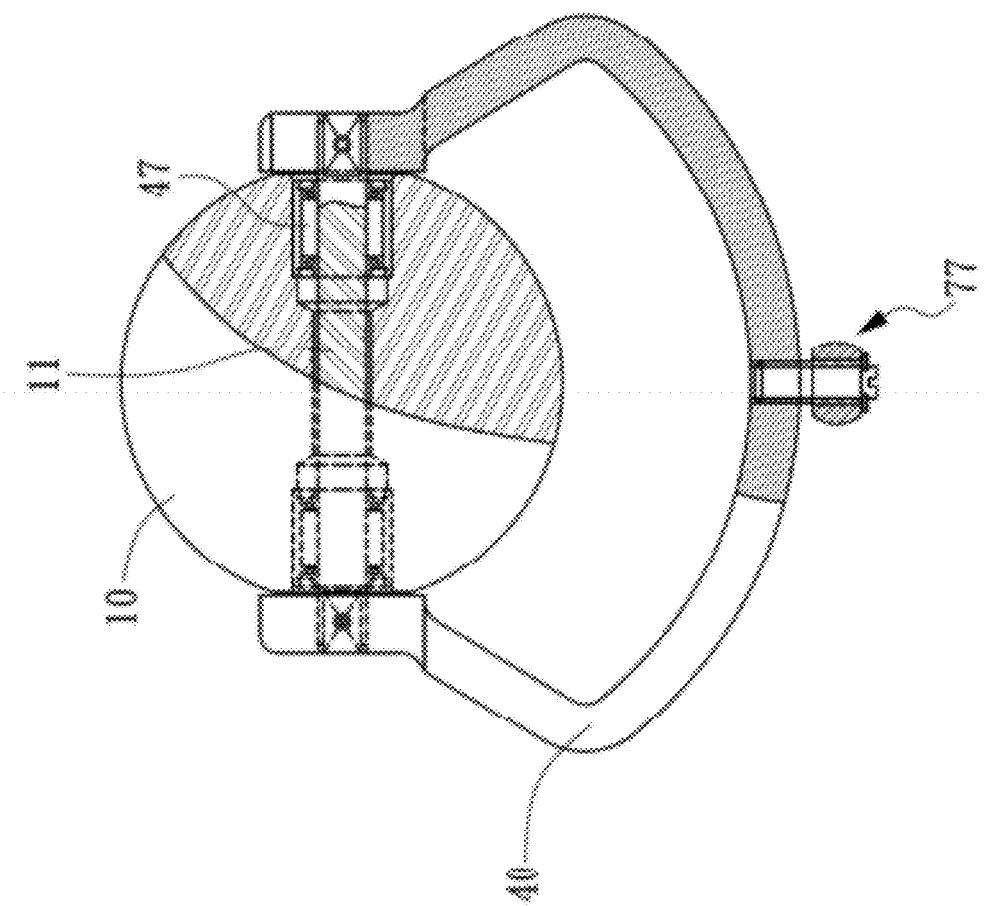
FIG. 15A is a side view of a friction ball coupled to its corresponding supporting bracket in the second embodiment of the invention.
Figure 15B:
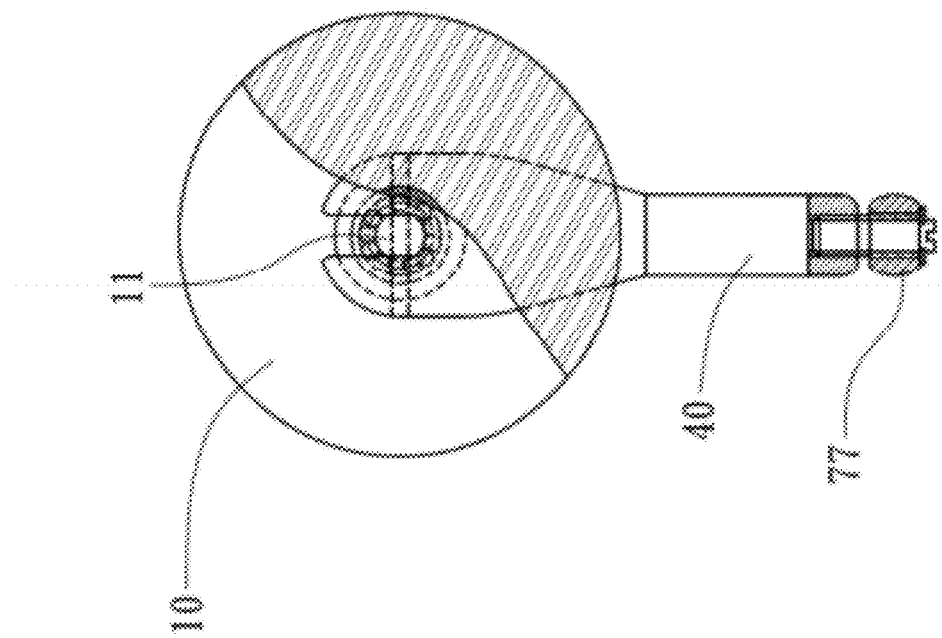
FIG. 15B is a side view of a friction ball coupled to its corresponding supporting bracket in the second embodiment of the invention.

Please refer to FIG. 10 and FIG. 11, which are a sectional view of a speed adjusting mechanism for roller traction toroidal CVT with barrel cam according to a second embodiment of the invention, and a side view thereof. It is noted that the mechanism used in this second embodiment for power transferring is exactly the same as those depicting in FIG. 1 so that it is not described further herein. The difference is that: instead of the screw gear set, the rotation 19 is designed to drive a barrel cam 73 to rotate for achieving a specific speed ratio changing. There are a plurality of cam paths 74 formed on the barrel cam 73 in a manner that the number of the cam paths 74 is the same as that of the friction balls 10 and each cam path 74 is arranged parallel with the axis of the input shaft 1. Each cam path 74 is designed for a sliding rod 77 to fit therein whereas the sliding rod has a roller mounted thereon, and the sliding rods are fixedly secured to their corresponding supporting brackets 40 at the same positions thereon while connecting the supporting brackets 40 to the spindles 10 of their corresponding friction balls, as shown in FIG. 15A and FIG. 15B. Thereby, when the rotation shaft 19 is driven to rotate by the motor 22, the barrel cam 73 will be brought along to rotate and thus force all the sliding rods 77 inset in their corresponding cam paths 74 to be pressed to move accordingly, as shown in FIG. 12 and FIG. 13. Moreover, the moving sliding rods 77 are going to bring their corresponding supporting brackets 40 to move as well, by that the spindles 11 of all the friction balls 10 will be tilted, i.e. a tilting angle 0 relating to the inclination of the spindles 11 of friction balls 10 is achieved, and thus the changing of the rotation speed ratio of the input shaft 1 and the output shaft 15 is achieved. In addition, since each supporting bracket 40 is restricted by a limiter 45 in their corresponding grooves 58, each supporting bracket 40 is only allow to move revolving on the center of its corresponding friction ball 10 in an arc-shaped path. For achieving optimal contacting, the barrel cam 73 is shaped like a barrel for matching with the traveling trajectory of the supporting brackets 40 in a manner that the embedded depth of each sliding rod 77 inside its corresponding cam path 74 is maintained the same at all time.

For the convenience of assembly, the barrel cam 73 can be split in half into a left barrel cam 73a and a right barrel cam 73b which are fixedly secured to the rotation shaft 19 by a bolt 75 so that they can be brought to rotate therewith, as shown in FIG. 16. Moreover, the left barrel cam 73a and the right barrel cam 73b are precisely coupled to the aligning surface 78 of the rotation shaft 19, and the two are aligned precisely with each other and connected by the use of the aligning pins 76, 79 so as to prevent the cam paths 74 formed thereon from breaking. Since all the friction balls 10 and their corresponding spindles 11, supporting brackets 40 and sliding rods 77 are all the same, the resulting speed adjusting mechanism will not suffer the phase difference problem as the aforesaid speed adjusting mechanism using screw gear set so that it can be manufactured with less cost. Not to mention that the mechanism of the cam path and the sliding rod is a very common mechanism capable of releasing the friction by the cooperation of lubricant and rollers so that it is s capable of enabling a smooth speed ratio change.

Figure 17:
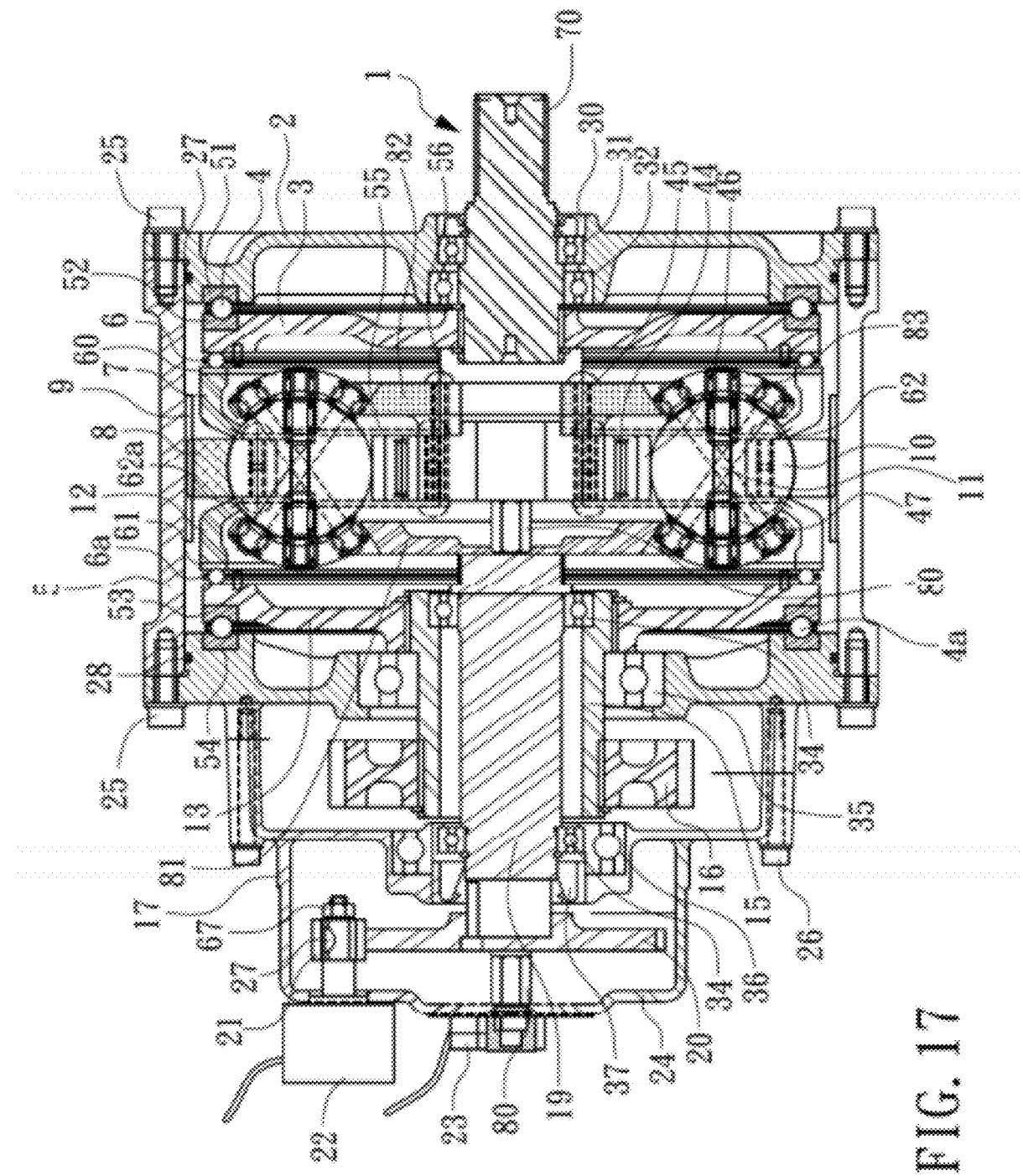
FIG. 17 is a sectional view of a speed adjusting mechanism for roller traction toroidal CVT with cam disc according to a third embodiment of the invention.
Figure 18:
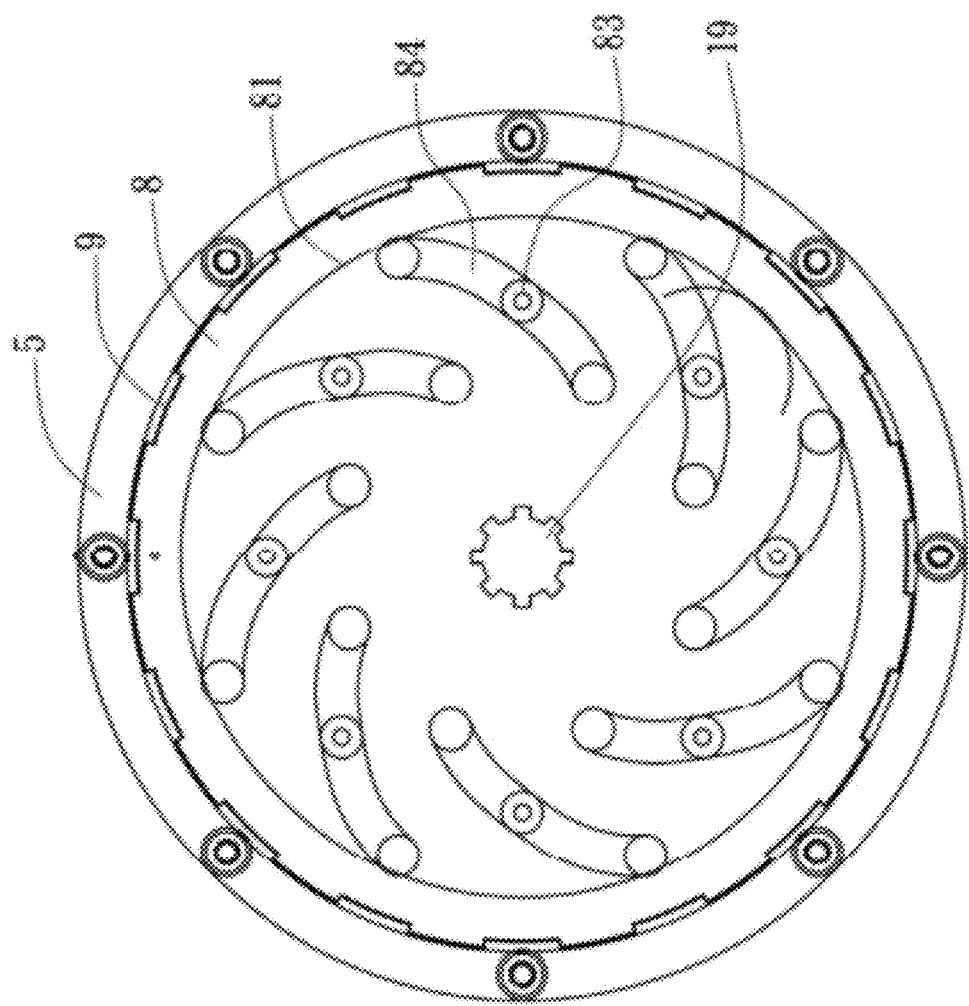
FIG. 18 is an output end view of the third embodiment of the invention.
Figure 19:
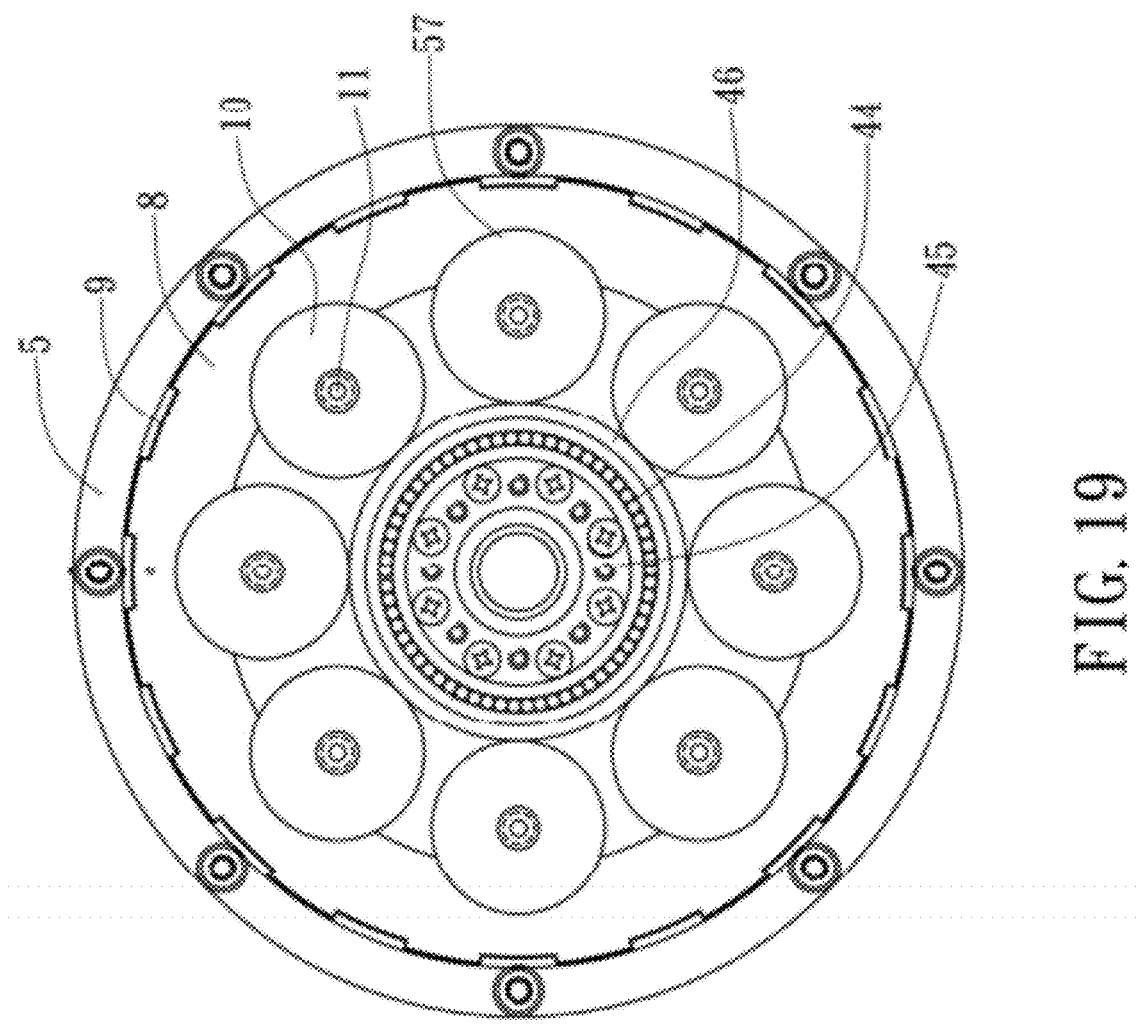
Figure 20:
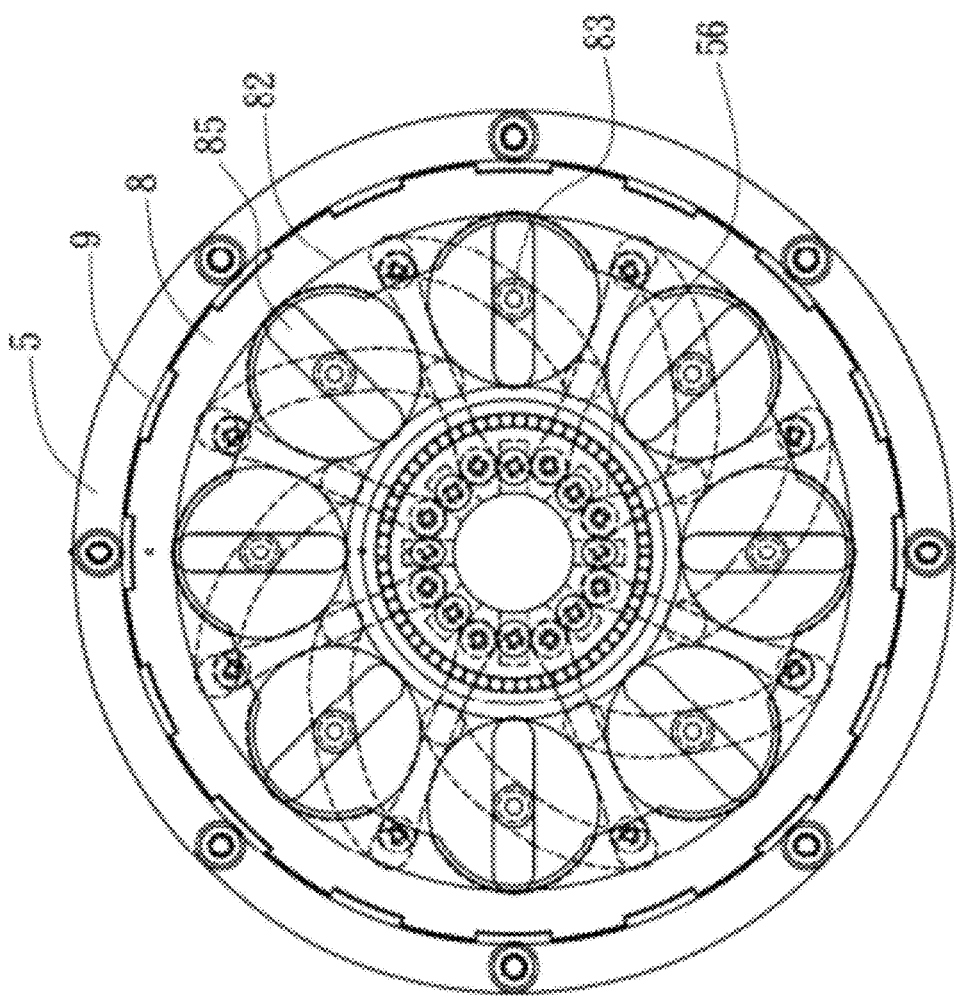
FIG. 20 is an input end view of the third embodiment of the invention.
Figure 21:
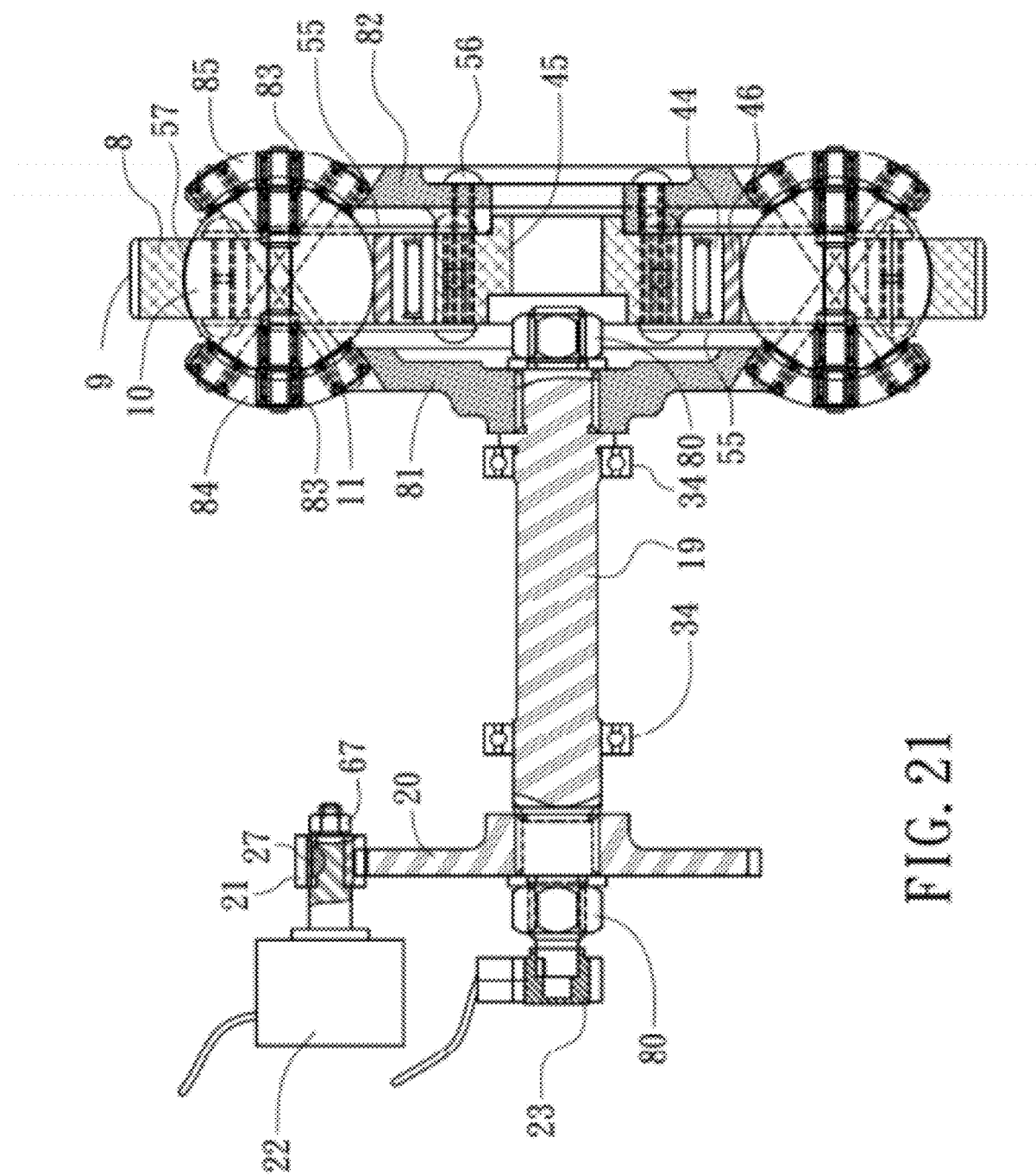
FIG. 21 is a sectional view of a rotation shaft and cam disc assembly used in third embodiment of the invention.
Figure 22B:
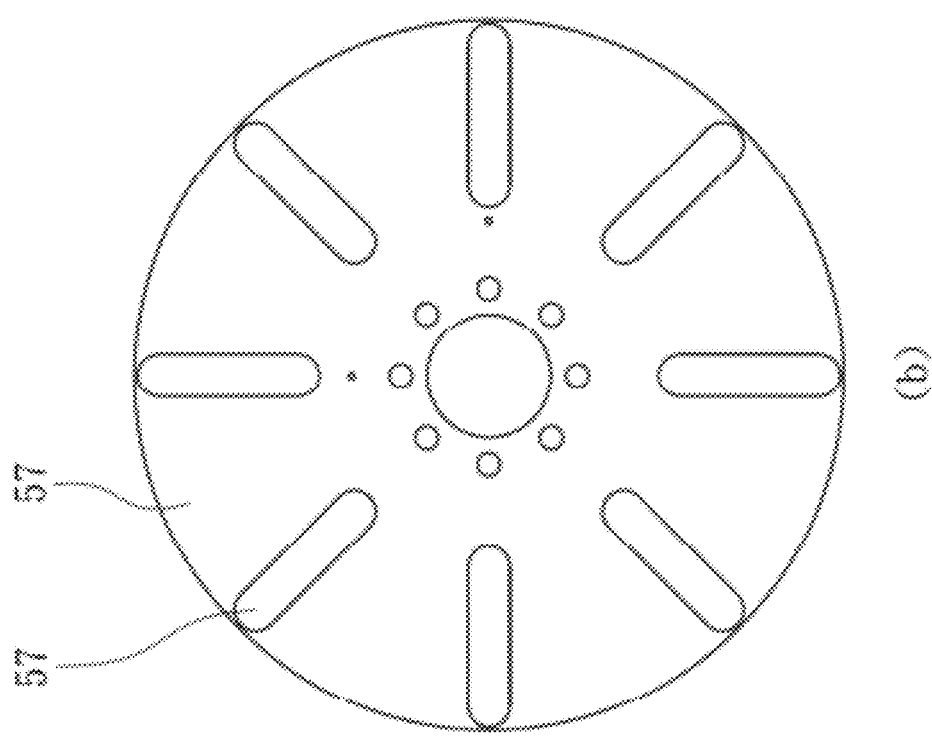
FIG. 22B is a side view of a stationary cam disc used in third embodiment of the invention.
Figure 22A:
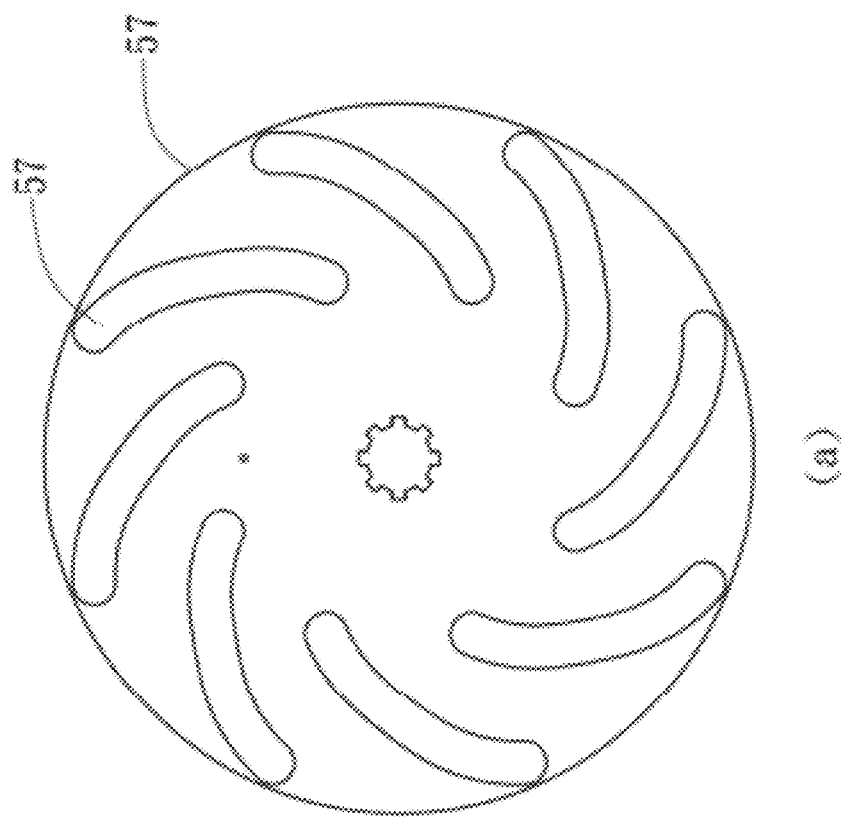
FIG. 22A is a side view of a rotary cam disc used in third embodiment of the invention.

Please refer to FIG. 17, which is a sectional view of a speed adjusting mechanism for roller traction toroidal CVT with cam disc according to a third embodiment of the invention. It is noted that the mechanism used in this second embodiment for power transferring is exactly the same as those depicting in FIG. 1 so that it is not described further herein. In FIG. 17, instead of the screw gear set, the rotation 19 is designed to drive a plate-like rotary cam disc 81 to rotate for achieving a specific speed ratio changing, and the rotary cam disc 81 is arranged perpendicular to the axis of the input shaft 1 while being fixedly secured to the end of the rotation shaft 19 by a nut 80. Moreover, there are a plurality of cam paths 84 formed on the rotary cam disc 81 in a manner that the number of the cam paths 84 is the same as that of the friction balls 10 and each cam path 84 is arranged radially extending out of and perpendicular to the axis of the input shaft 1 in a trajectory defined by a function determining the response of the speed ratio changing, as shown in FIG. 22A. As shown in FIG. 17, at a position opposite to the rotary cam disc 81 that is separated by the friction balls 10, there is a plate-like stationary cam disc 82 being disposed also perpendicular to the axis of the input shaft 1. Similarly, there are also a plurality of cam paths 85 formed on the stationary cam disc 82 at positions corresponding to the friction balls 10 in a manner that their trajectories are radially distributed straight lines traveling toward the axis of the input shaft 1, as shown in FIG. 22B. The rotary cam disc 81 and the stationary cam disc 82 are arranged parallel with each other. The rotary cam disc 81 can be driven to rotate by the rotation shaft 19 while enabling the cam paths 84 formed thereon to rotate as well. However, the stationary cam disc 82 is fixedly secured on a limiter 45 by screws 56 that it is not able to move or rotate. It is noted that the cam paths 84, 85 formed respectively on the rotary cam disc 81 and the stationary cam disc 82 are paired for the spindles 11 of their corresponding friction balls 10 to fit therein while the cam paths 84 on the rotary cam disc 81 can be rotated and the cam paths 85 of the stationary cam disc 82 are not. Although the two ends of each spindle 11 is not supported by parts similarly to the supporting bracket, they are each having a roller 83 attached therein while being designed to extend respectively into the rotary cam disc 81 and the stationary cam disc 82 for enabling the roller 83 relating to the input shaft 15 to inset into its corresponding cam path 84 on the rotary cam disc 81, as shown in FIG. 18, and the roller 83 of same spindle 11 relating to the output shaft 1 to inset into the corresponding cam path 85 on the stationary cam disc 82, as shown in FIG. 20. Thereby, when the rotary cam disc 81 is brought along to rotate by the rotation shaft 19, the cam paths 84 of the rotary cam disc 81 will be brought along to rotate and thus press the rollers 83 of the spindles 11 in a manner that the spindles 11 of the friction balls 10 are forced to move by the defining of their corresponding cam paths 84. However, as another ends of the spindles 11 are fitted inside the cam paths 85 of the stationary cam disc 82, they can only move linearly up and down in the cam path 85s. In addition, the plural friction balls 10, being equiangularly disposed around the input shaft 1, are restricted by the ball receiving parts 57 formed on the interior of the outer ring seats 8 at their designated locations for allowing each friction ball 10 only to revolve on its own center; and there is an inner ring seat 46 located radially inside the enclosure of the plural friction balls 10, by that the plural friction balls 10 are defined in spaces sandwiched between the inner ring seat 46 and the outer ring seat 8, as shown in FIG. 19. Accordingly, all the spindles 11 can be driven to swing simultaneously about the centers of their friction balls 10. That is, when the motor 22 is directed by a control signal to drive the gear sets 20, 21 for bringing the rotate shaft as well as the rotary cam disc 81 to rotate, the end of the spindles 11 inset in the cam paths 84 will be pressed by the rotation of the cam paths 84 and thus moved simultaneously up and down linearly by the define of the cam paths 85, by that the tilting angles θ relating to the inclination of the spindles 11 of friction balls 10 will be varied simultaneously by the same extent and thereby the rotation speed ratio can be adjusted precisely, as shown in FIG. 21. Similarly, the inner ring seat 46 is tightly engaged to the exterior of the nearing 44 while allowing the same to rotate freely, and the bearing 44 is arranged coaxial with the input shaft 1, by that although the pressure exerting on the plural friction balls 10 from the input friction disc 7 will be passed to force on the inner ring seat 46 as the inner ring seat 46 is being driven to revolve on the axis of the bearing 44 by the revolving of the friction balls 10, there will be no significant power loss resulting from the friction caused by the aforesaid motions. Moreover, in this embodiment, since there is no supporting bracket used for supporting the spindles 11, the limiter 45 is not used for restricting the non-existing supporting brackets, but is used for restricting the stationary cam disc 82 and thus defining the movement of the spindles.

To sum up, operationally, the speed adjusting mechanism for roller traction toroidal continuously variable transmission of the invention is able to control the output of a motor by a computer while feeding the outputted torque to be enlarged by a gear set and then used for driving a rotation shaft to rotate. Moreover, the rotation shaft, being ensheathed by a hollow power output shaft, is extending inside a roller traction toroidal continuously variable transmission where it is further connected to a rotary parts, such as a cam disc assembly, a barrel cam or a screw gear sets. As the rotary part is directly engaged with the spindles of the friction ball in the transmission or the supporting brackets supporting to the spindles, the rotary part being driven to rotate by the rotation shaft can change the tilting angles of the friction ball's spindles and thus change the rotation speed ratio of the input and the output shafts in the transmission.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A speed adjusting mechanism for roller traction toroidal continuously variable transmission, comprising:
   an input disk;
   an output disk, coaxially and symmetrically positioned relative to the input disk;
   a rotation shaft driven by an electric motor, arranged passing thought the axes of input disk and output disk;
   an inner ring seat;
   an outer ring seat;
   a screw rod, coaxially connected to the rotation shaft so as to be brought to rotate therewith; and a plurality of substantially spherical friction balls, each friction ball respectively in contact with the input disk and output disk for bringing the input disk and output disk to rotate with the rotation of the same, each friction ball respectively in contact with the inner ring seat and outer ring seat, and each friction ball being enabled to rotate on a shaft positioned through the center of each friction ball respectively connected to a supporting bracket while each supporting bracket is further connected to an arc-shaped screw gear;

wherein, the inner ring seat is located radially inside the enclosure of the plural friction balls while being mounted on the bearing such that pressure exerting on the plural friction balls from the input disk will be exerted on the inner ring seat as the inner ring seat is driven to rotate by the rotating of the friction balls;

wherein, the outer ring seat is located radially outside and surrounding the friction balls;

wherein, the plural friction balls are restricted to spaces between the inner ring seat and the outer ring seat;

wherein, the screw rod has plural rows of thread teeth formed thereon for enabling each row of thread teeth to engage with its corresponding screw gear, and is engaged to the screw gears for enabling the rotation of the screw rod to bring the screw gears to rotate correspondingly causing the spindles of the plural friction balls to tilt by the same extent and consequently enabling the input disk and the out disk to rotate at different rotation speeds;

wherein, the rows of thread teeth are formed on the screw rod at positions corresponding to the ordering of the plural friction balls, and the teeth of each screw gear engage the thread teeth of the screw rod such that the phase angle difference between any two adjacent screw gears is defined by a specific phase difference equal to the teeth pitch of the screw rod divided by the number of the friction balls.

2. The speed adjusting mechanism of claim 1, wherein the teeth of each screw gear are positioned according to the ordering of its corresponding friction balls and are defined by a specific phase difference.

3. The speed adjusting mechanism of claim 1, further comprising:

a cylinder-shaped limiter, disposed coaxial with the rotation shaft and having recesses formed thereon at positions corresponding to the screw gears for receiving the same therein, and thereby, restricting the screw gears to move in arc-like paths surrounding their centers on a surface coplanar with the axis of the rotation shaft.

* * * * *